United States Patent
Neese et al.

(10) Patent No.: US 9,972,179 B2
(45) Date of Patent: *May 15, 2018

(54) SYSTEM AND METHOD FOR NOISE DETECTION

(71) Applicants: Luke Isaac Neese, College Station, TX (US); Liang Ge, College Station, TX (US)

(72) Inventors: Luke Isaac Neese, College Station, TX (US); Liang Ge, College Station, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/254,898

(22) Filed: Sep. 1, 2016

(65) Prior Publication Data

US 2016/0371947 A1    Dec. 22, 2016

Related U.S. Application Data

(63) Continuation of application No. 14/935,060, filed on Nov. 6, 2015, now Pat. No. 9,472,086.

(Continued)

(51) Int. Cl.
*G08B 13/16* (2006.01)
*G08B 21/18* (2006.01)
(Continued)

(52) U.S. Cl.
CPC ........... *G08B 13/1672* (2013.01); *G01H 3/00* (2013.01); *G08B 21/182* (2013.01); *G08B 25/08* (2013.01);
(Continued)

(58) Field of Classification Search
CPC ....... G10K 11/1782; G10K 2210/3026; G10K 2210/51; G10K 2210/503; G10K 2210/1081; G10K 2210/3028; G10K 2210/3216; H04R 1/1083; H04R 2460/01; H04R 2499/13; H04R 2420/07; H04R 1/1041; H04R 1/1091; H04R 1/10; H04M 1/20; H04M 1/72527; H04M 1/72558; H04B 1/202; H04B 3/237; G06F 17/30749; G06F 17/30761; G06F 13/385; G06F 3/165; G06F 3/011; G06F 17/30026; G06F 3/167; H04S 1/007; H04S 1/005; H04S 7/301; H04S 7/303; G10L 15/20; G10L 2015/223; G10L 2021/02166;
(Continued)

(56) References Cited

U.S. PATENT DOCUMENTS

| | | | | |
|---|---|---|---|---|
| 4,691,707 A * | 9/1987 | Sankar | ............... | G01S 15/8954 600/443 |
| 5,586,086 A * | 12/1996 | Permuy | ................... | F41G 3/147 367/127 |
| 5,831,936 A * | 11/1998 | Zlotnick | ................. | G01S 3/801 367/124 |
| 5,973,998 A * | 10/1999 | Showen | ............... | G01S 5/0036 367/124 |
| 7,586,812 B2 * | 9/2009 | Baxter | .................... | F41H 13/00 367/127 |
| 8,422,691 B2 * | 4/2013 | Asada | .................. | G10K 11/178 381/103 |
| 2004/0100868 A1 * | 5/2004 | Patterson, Jr. | .......... | F41H 11/00 367/127 |
| 2005/0237186 A1 * | 10/2005 | Fisher | ..................... | F41H 11/00 340/539.22 |
| 2006/0268663 A1 * | 11/2006 | Bitton | ..................... | G01S 3/801 367/127 |
| 2007/0133351 A1 * | 6/2007 | Taylor | ..................... | G01H 9/00 367/118 |

(Continued)

*Primary Examiner* — Oyesola C Ojo
(74) *Attorney, Agent, or Firm* — Douglas Baldwin

(57) ABSTRACT

A system for noise detection. Aspects of the system include a detection unit for detecting and responding to a predetermined noise such as a gunshot. In some embodiments, at least a portion of the unit may be utilized both within a confined space, such as a room in a building, or inside a machine, and in large environments such as outdoors. The detection unit may comprise a digital computing device, a digital-to-analog converter, a speaker acoustic output, a microphone acoustic input, an analog-to-digital converter, and a transmitter.

20 Claims, 25 Drawing Sheets

Related U.S. Application Data

(60) Provisional application No. 62/076,598, filed on Nov. 7, 2014.

(51) Int. Cl.
    *G01H 3/00*         (2006.01)
    *G08B 25/08*       (2006.01)
    *G01S 7/539*       (2006.01)
    *G01S 3/801*       (2006.01)
    *G01S 3/803*       (2006.01)

(52) U.S. Cl.
    CPC ............... *G01S 3/801* (2013.01); *G01S 3/803* (2013.01); *G01S 3/8032* (2013.01); *G01S 7/539* (2013.01)

(58) Field of Classification Search
    CPC ..... G10L 21/0208; G10L 25/03; G10L 25/51; H04N 21/4126
    USPC .......................................................... 381/104
    See application file for complete search history.

(56) References Cited

U.S. PATENT DOCUMENTS

2014/0098964 A1* 4/2014 Rosca .................... H04R 1/406
                                                             381/56
2015/0185161 A1* 7/2015 Gettings ................ G01N 21/84
                                                             73/865.8
2015/0373474 A1* 12/2015 Kraft .................... H04R 1/1083
                                                             381/17

\* cited by examiner

SYSTEM AND METHOD FOR NOISE DETECTION

CROSS-REFERENCE TO RELATED APPLICATIONS

This application is a continuation application of U.S. application Ser. No. 14/935,060 filed Oct. 6, 2015 which application and claims priority to Provisional Patent Application No. 62/076,598, filed Nov. 7, 2014, both of which are hereby incorporated by reference in its entirety.

FIELD OF THE INVENTION

The present disclosure relates to a system and method for noise detection, more specifically a system and method for noise detection within a confined space or outdoors.

BACKGROUND OF THE INVENTION

Noise detection may be very important when relating to dire situations. A large problem in the United States concerns mass shootings inside of public places. This situation calls for a quick response time and detailed feedback of the situation in order to keep people out of harm's way. Quick confirmation of a situation and the acoustic mapping of an indoor and outdoor area may aid in the process of timely responding to a situation such as the above situation. This same technology is valuable for any situation where an acoustic anomaly or noise warns of danger or failure of a component or machine. While timely gunshot detection may save lives, the timely notification of an explosion, the failure in a machine, or a leak in a pipe might save both lives and the environment. This system, and methodology, may be used to monitor the conditions and events in any confined space, inside machinery; underwater; pipelines; industrial buildings; and locations with limited or difficult access such as rooftops, or equipment rooms. The same techniques and system can be configured to detect various noises at various thresholds over time in given environmental settings. Systems can be placed in various locations to detect varying noise levels in comparison to surroundings and the system can learn surrounding environmental cues which are placed in device storage for comparison against a given noise or acoustic anomaly. Need exists for improved systems and methods for noise detection.

BRIEF SUMMARY OF THE INVENTION

The disclosure may provide a system for noise detection. The system may comprise a detection unit for detecting and responding to noise in accordance with embodiments. In embodiments, at least a portion of the unit may be utilized both within a confined space, such as a room in a building, or inside a machine, and in large environments such as outdoors. The detection unit may comprise a digital computing device, a digital-to-analog converter, a speaker acoustic output, a microphone acoustic input, an analog-to-digital converter, and a transmitter.

The digital-to-analog converter may be coupled between the digital computing device and the speaker acoustic output. Output from the detection unit may be expelled from the speaker acoustic output in the form of acoustic waves.

The digital-to-analog converter may be configured to perform task such as, but not limited to receiving an outbound digital signal from the digital computing device, converting the outbound digital signal to an outbound analog signal, and transmitting the outbound analog signal to the speaker acoustic output. The speaker acoustic output may be configured to receive the outbound analog signal from the digital-to-analog converter and to output an outbound acoustic signal (Output) responsive thereto.

The microphone acoustic input may be configured to receive an inbound acoustic signal (Input) and provide an inbound analog signal. The microphone acoustic input may be coupled to the analog-to-digital converter. In embodiments, the analog-to-digital converter may be coupled between the microphone acoustic input and the digital computing device. The analog-to-digital converter may be configured to perform tasks such as, but not limited to receiving an inbound analog signal from the microphone acoustic input, converting the inbound analog signal to an inbound digital signal, and transmitting the inbound digital signal to the digital computing device responsive thereto.

In embodiments, the inbound acoustic signal may comprise at least one of a reflection of the outbound acoustic signal and a specific noise. In embodiments, the outbound acoustic signal may be expelled by the speaker acoustic output to the environment surrounding the detection unit in order to create an acoustic map of the environment. The inbound acoustic signal may be interpreted by the detection unit, which may create the mapping based on what form the inbound acoustic signal had been in when received by the detection unit.

In embodiments, the digital computing device may be coupled to the transmitter. The digital computing device may be configured to perform an analysis on the inbound digital signal. In embodiments, the analysis may determine at least one of: if the inbound digital signal is consistent with the inbound acoustic signal being a specific noise, and an acoustic mapping of the environment in which the unit is located. In embodiments, the digital computing device may additionally be configured to send a signal to the transmitter if the analysis determines that the inbound digital signal is consistent with the inbound acoustic signal being a specific noise and to record the acoustic mapping of the environment in which the unit is located onto a storage medium.

The transmitter may be configured to transmit a signal via a computer communications network to a host computer system responsive to receiving a signal from the digital computing device. In embodiments, the host computer system may comprise one or more components of computing system. In embodiments, the host computer system may be computing system.

The disclosure may further comprise a method for noise detection. The method may comprise mapping an environment. In embodiments, the step of mapping an environment may comprise generating an outbound acoustic signal and reflected acoustic signals. In embodiments, the reflected acoustic signals may be the reflections of the outbound acoustic signal after it has reflected off of portions of the ambient environment. Once the reflected acoustic signals have been generated, the reflected acoustic signals may be received.

Mapping may further comprise generating an acoustic map of the ambient environment based on analysis of the reflected acoustic signals and storing the acoustic map of the ambient environment.

The method may further comprise receiving an inbound acoustic signal and determining if the inbound acoustic signal is a desired noise, such as a gunshot. In embodiments, the determining may comprise analyzing the inbound acoustic signal against known gunshot signals or other noises and analyzing the inbound acoustic signal against the acoustic map of the ambient environment.

The method may further comprise transmitting a notification signal responsive to a positive determination that the inbound acoustic signal is consistent with desired noise such as a gunshot or other designated noise or acoustic anomaly.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 8 displays a second screenshot from a detection unit in accordance with embodiments.

DETAILED DESCRIPTION OF ILLUSTRATIVE EMBODIMENTS

Figure 1:
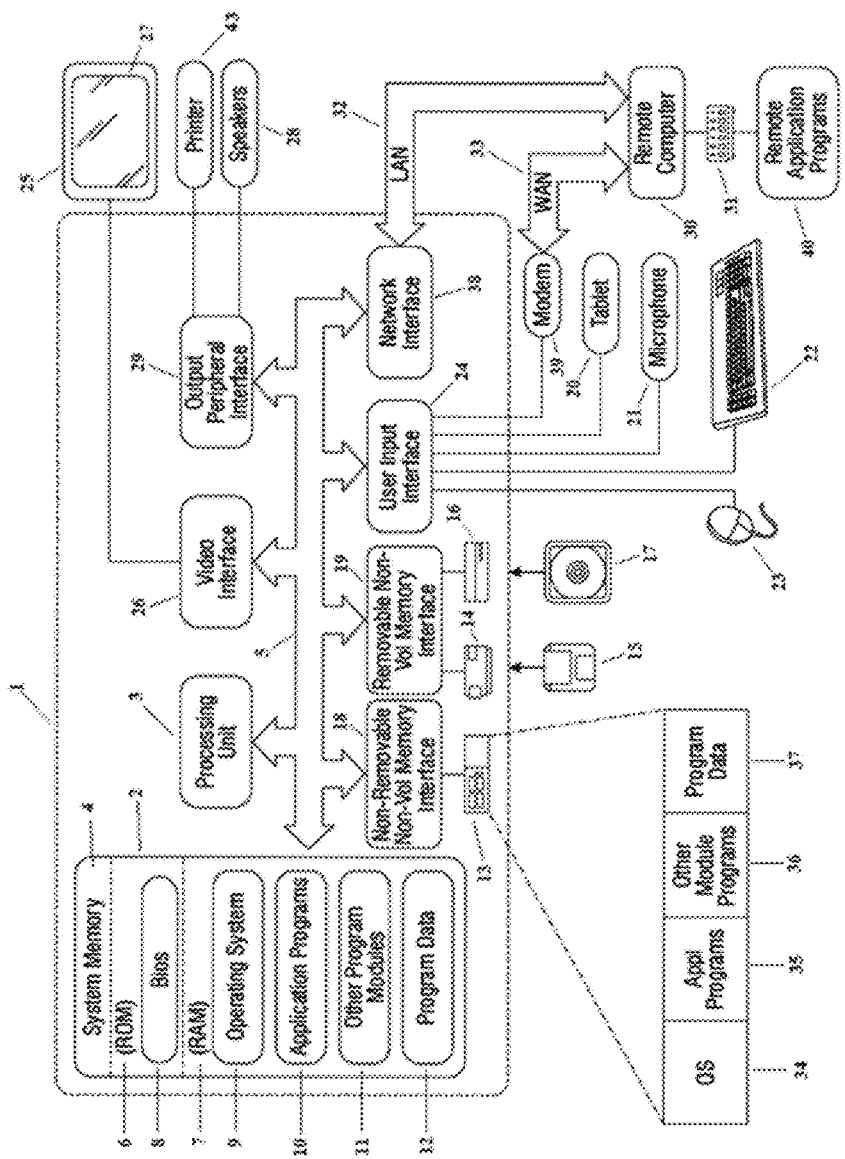
FIG. 1 displays a computing system and related peripherals that may operate with the method and system for noise detection in accordance with embodiments.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although described with reference to personal computers and the Internet, one skilled in the art could apply the principles discussed herein to any computing or mobile computing environment. Further, one skilled in the art could apply the principles discussed herein to communication mediums beyond the Internet.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

With reference to FIG. 1, an exemplary system within a computing environment for implementing the disclosure includes a general purpose computing device in the form of a computing system 1, commercially available from, for example, Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media in the form of volatile and/or nonvolatile memory such as read only memory (ROM) 6 and random access memory (RAM) 7. A basic input/output system (BIOS) 8, containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11, and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36, and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer, 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touch-screen panel 27 or the like. Note that the monitor and/or touch screen panel can be physically coupled to a housing in which the computing system 1 is incorporated, such as in a tablet-type personal computer. In addition, computers such as the computing system 1 may also include other peripheral output devices such as speakers 28 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, mobile electronic devices), a server, a router, a network PC, a peer device or other common network node, and typically includes many or all of the elements described above relative to the computing system 1, although only a memory storage device 31 has been illustrated. The logical connections depicted include a local area network (LAN) 32 connecting through network interface 38 and a wide area network (WAN) 33 connecting via modem 39, but may also include other networks. Such networking environments are commonplace in offices, enterprise-wide computer networks, intranets, and the Internet.

For example, in the present embodiment, the computer system 1 may comprise the source machine from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

Referring to FIG. 1, for the purposes of this disclosure, it will be appreciated that remote computer 30 may include any suitable terms such as, but not limited to "device", "processor based mobile device", "mobile device", "electronic device", "processor based mobile electronic device", "mobile electronic device", "wireless electronic device", "location-capable wireless device," and "remote device" including a smart phone or tablet computer.

The central processor operating pursuant to operating system software such as, but not limited to Apple IOS®), Google Android®, IBM OS/2®, Linux®, UNIX®, Microsoft Windows®, Apple Mac OS.X®, and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation, and algorithm generation. The provided functionality may be embodied directly in hardware, in a software module executed by a processor, or in any combination of the two.

Furthermore, software operations may be executed, in part or wholly, by one or more servers or a client's system, via hardware, software module, or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Figure 2:
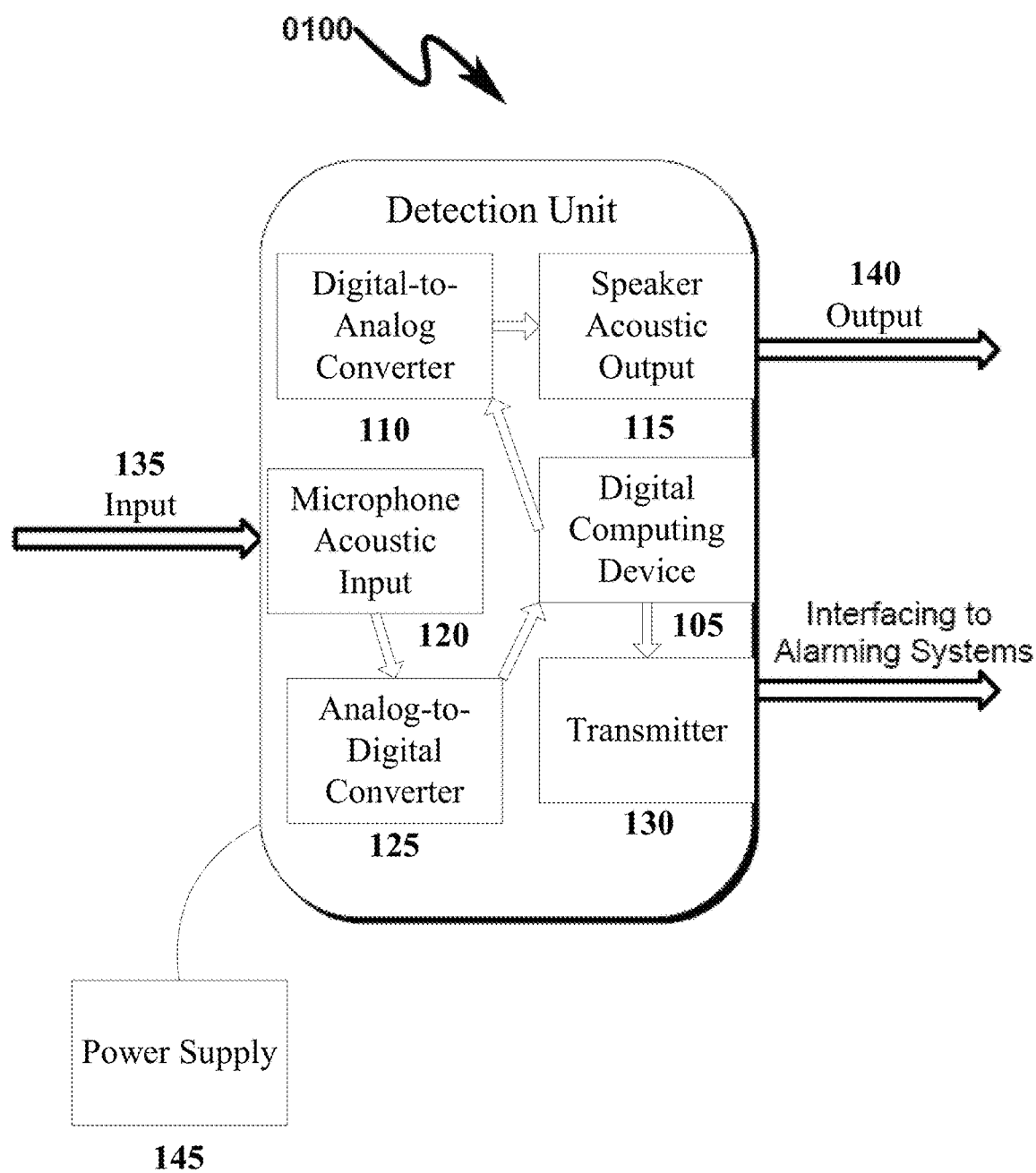
FIG. 2 depicts a detection unit for detecting and responding to noise in accordance with embodiments.

FIG. 2 depicts a detection unit 100 for detecting and responding to noise in accordance with embodiments. The detection unit 100 may comprise multiple components that may function as a single unit to detect noise. In embodiments, at least a portion of the unit 100 may be utilized within a confined space, such as a room in a building. The detection unit may comprise a digital computing device 105, a digital-to-analog converter 110, a speaker acoustic output 115, a microphone acoustic input 120, an analog-to-digital converter 125, and a transmitter 130.

The digital-to-analog converter 110 may be coupled between the digital computing device 105 and the speaker acoustic output 115. Output from the detection unit 100 may be expelled from the speaker acoustic output 115 in the form of acoustic waves.

The digital-to-analog converter 110 may be configured to perform task such as, but not limited to receiving an outbound digital signal from the digital computing device, converting the outbound digital signal to an outbound analog signal, and transmitting the outbound analog signal to the speaker acoustic output 115. The speaker acoustic output 115 may be configured to receive the outbound analog signal from the digital-to-analog converter 110 and to output an outbound acoustic signal (Output) 140 responsive thereto.

The microphone acoustic input 120 may be configured to receive an inbound acoustic signal (Input) 135 and provide an inbound analog signal. The microphone acoustic input 120 may be coupled to the analog-to-digital converter 125. In embodiments, the analog-to-digital converter 125 may be coupled between the microphone acoustic input 120 and the digital computing device 105. The analog-to-digital converter 125 may be configured to perform tasks such as, but not limited to receiving an inbound analog signal from the microphone acoustic input 120, converting the inbound analog signal to an inbound digital signal, and transmitting the inbound digital signal to the digital computing device 105 responsive thereto.

In embodiments, the inbound acoustic signal 135 may comprise at least one of a reflection of the outbound acoustic signal 140 and a specific noise. In embodiments, the outbound acoustic signal 140 may be expelled by the speaker acoustic output 115 to the environment surrounding the detection unit 100 in order to create a mapping of the environment. The inbound acoustic signal 135 may be interpreted by the detection unit 100, which may create the mapping based on what form the inbound acoustic signal 135 had been in when received by the detection unit 100. As an example, if the detection unit 100 is in a classroom, the detection unit 100 may create a map of a classroom including desks, students, and a whiteboard in response to receiving the inbound acoustic signal 135.

In embodiments, the digital computing device 105 may be coupled to the transmitter 130. The digital computing device 105 may be configured to perform an analysis on the inbound digital signal. In embodiments, the analysis may determine at least one of: if the inbound digital signal is consistent with the inbound acoustic signal 135 being a specific noise, and an acoustic mapping of the environment in which the unit 100 is located. In embodiments, the digital computing device 105 may additionally be configured to send a signal to the transmitter if the analysis determines that the inbound digital signal is consistent with the inbound acoustic signal 135 being a specific noise and to record the acoustic mapping of the environment in which the unit 100 is located onto a storage medium.

The transmitter may be configured to transmit a signal via a computer communications network to a host computer system responsive to receiving a signal from the digital computing device. In embodiments, the host computer system may comprise one or more components of computing system 1. In embodiments, the host computer system may be computing system 1.

In embodiments, the detection unit 100 may further comprise a power supply 145 for providing electricity to components of the detection unit 100.

In embodiments, a system may comprise a plurality of detection units 100 within a detection unit network.

In embodiments, the detection unit 100 may be incorporated into a fire/smoke detector.

In embodiments, the outbound acoustic signal 140 may comprise an ultrasonic frequency for acoustically mapping the environment in which the detection unit 100 is located.

Figure 3:
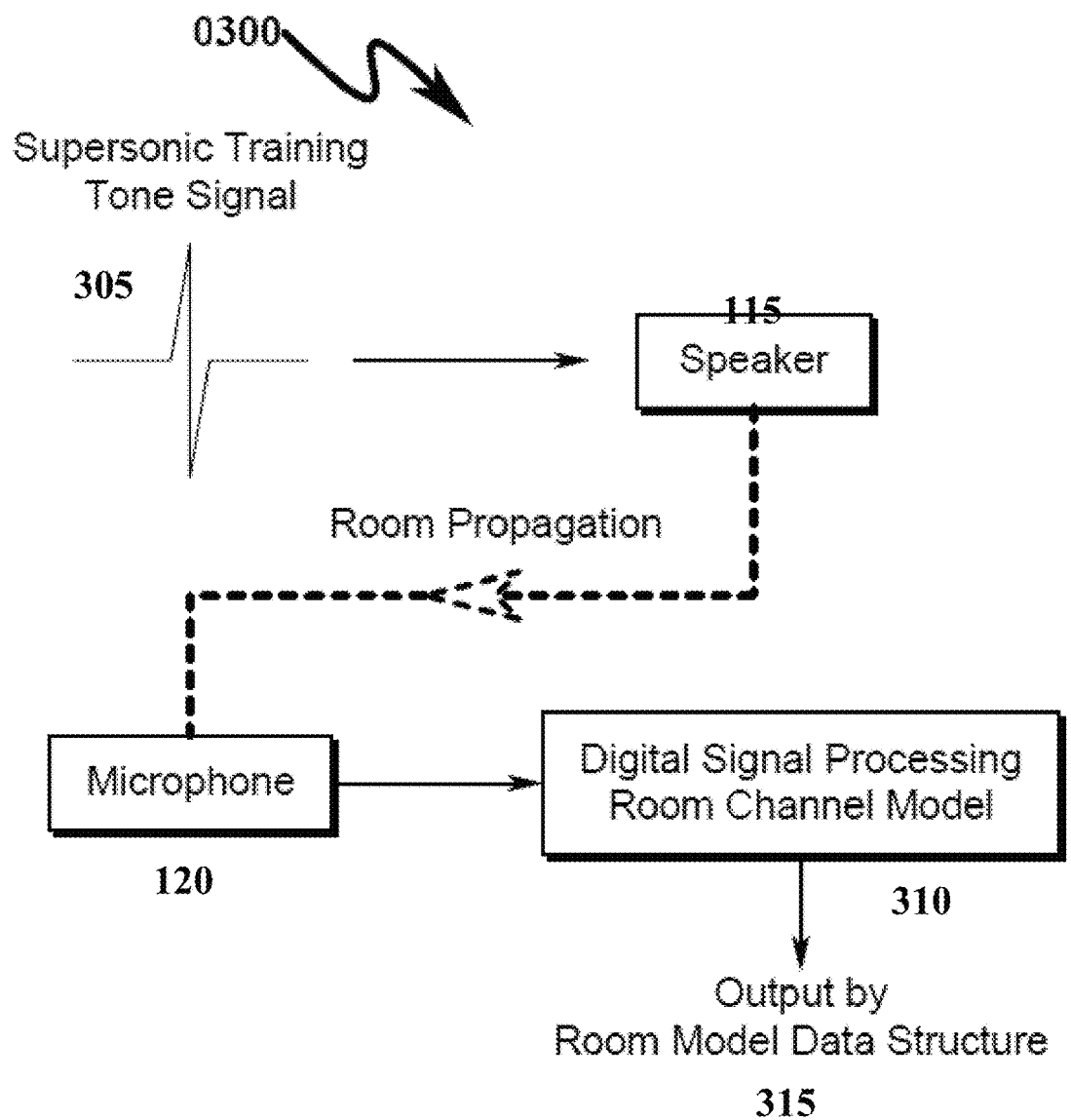
FIG. 3 displays a flow diagram for a room reverberation training process in accordance with embodiments.

FIG. 3 displays a flow diagram 300 for a room reverberation training process in accordance with embodiments. A supersonic training tone signal 305 may be expelled by a speaker acoustic output 115. Once expelled, the supersonic training tone signal may propagate within the environment in which the detection unit 100 resides (such as a room). The propagated supersonic training tone signal 305 may then be received by a microphone acoustic input 120 in the form of an inbound acoustic signal 135.

Once received by the microphone acoustic unit 120, the inbound acoustic signal may be formed into a room channel model 310 via digital signal processing performed by an analog-to-digital converter 125 and a digital computing device 105. An output in the form of a room model data structure 315 may be extracted from the digital computing device 105. In embodiments, the room model data structure 315 may comprise at least one of a number of reflections, a delay of each reflection path, an attenuation of each reflection path, and a Doppler frequency shift.

Figure 4:
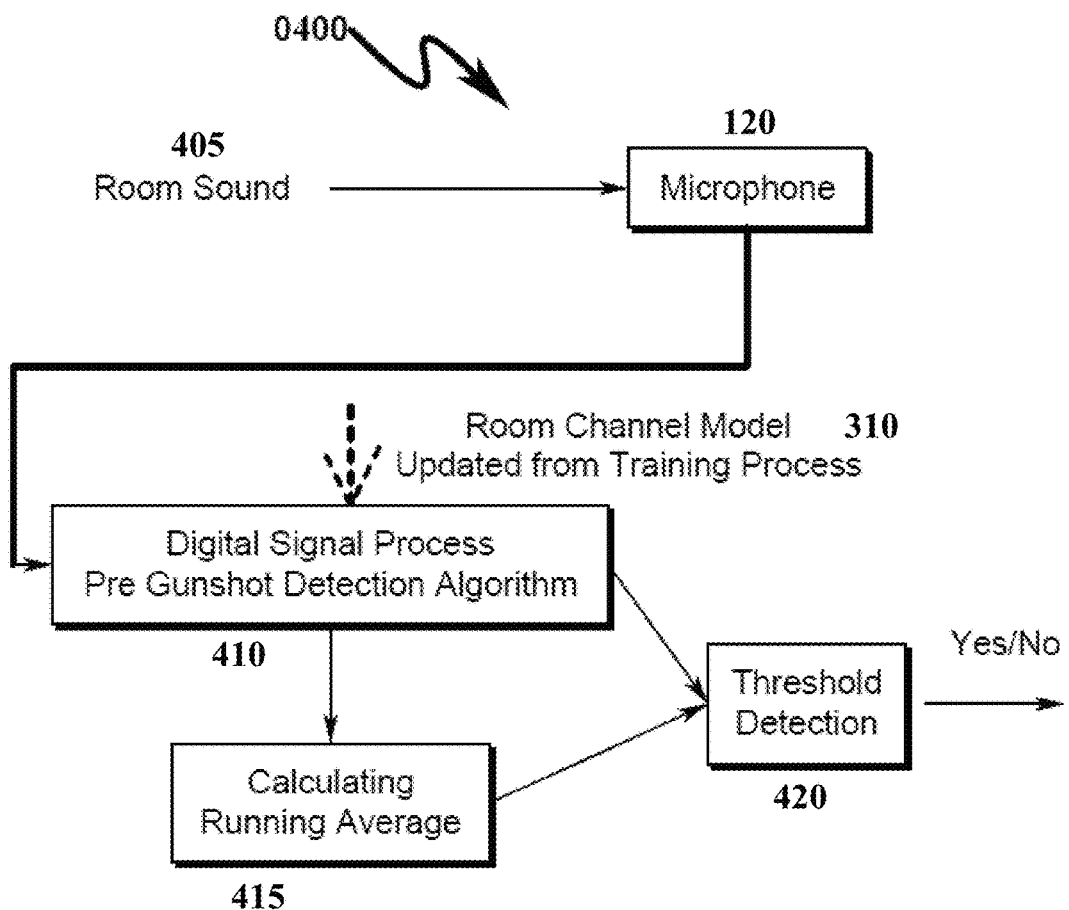
FIG. 4 displays a flow diagram for a room detecting process in accordance with embodiments.

FIG. 4 displays a flow diagram 400 for a room detecting process in accordance with embodiments. In embodiments, this flow diagram 400 may be associated with a detection unit 100 that may have completed a room reverberation training process (FIG. 3). In embodiments, the detection unit may be trained to detect a gunshot. A room sound 405 may be received by a microphone acoustic input 120 for analysis. The room channel model 310 may be updated within the unit 100 prior to processing of the room sound 405. The room sound 405 may be sent to the analog-to-digital converter 125 as well as the digital computing device 105 in order to process the room sound utilizing a pre-gunshot detection algorithm 410 and digital signal processing. In embodiments, the pre-gunshot detection algorithm 410 may be tailored to transform the room sound 405 based on the type of room sound 405 (not just a gunshot). The processing may include calculating a 415 running average and detecting 420 a threshold.

Figure 5:
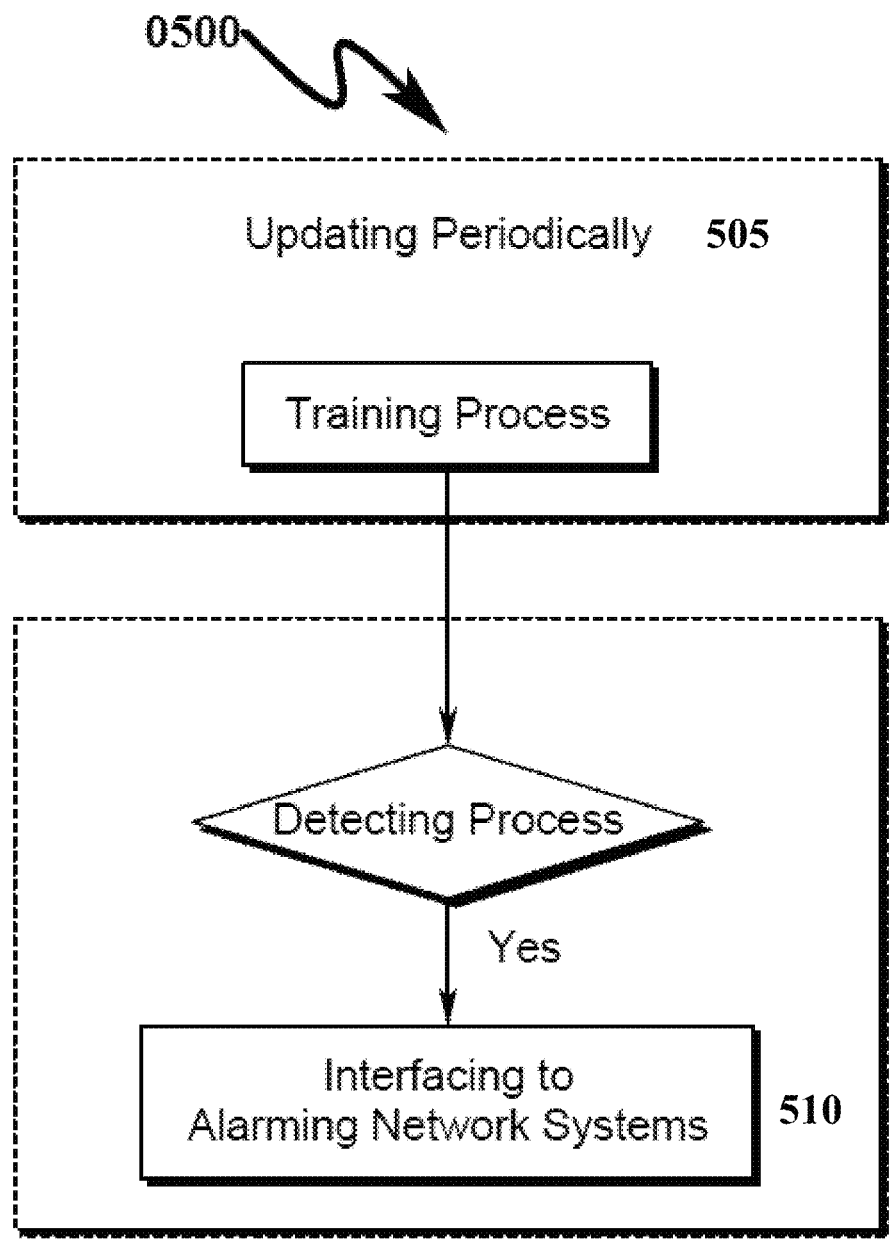
FIG. 5 displays a flow diagram for sending information to an alarming network system in accordance with embodiments.

FIG. 5 displays a flow diagram 500 for sending information to an alarming network system in accordance with embodiments. Within the detection unit 100, the training process of FIG. 3 may be updated periodically 505. The updated training processes may update a plurality of detecting processes of FIG. 4. In embodiments, data representative of the detecting processes may be sent to the interface of the alarming network system 510.

Figure 6:
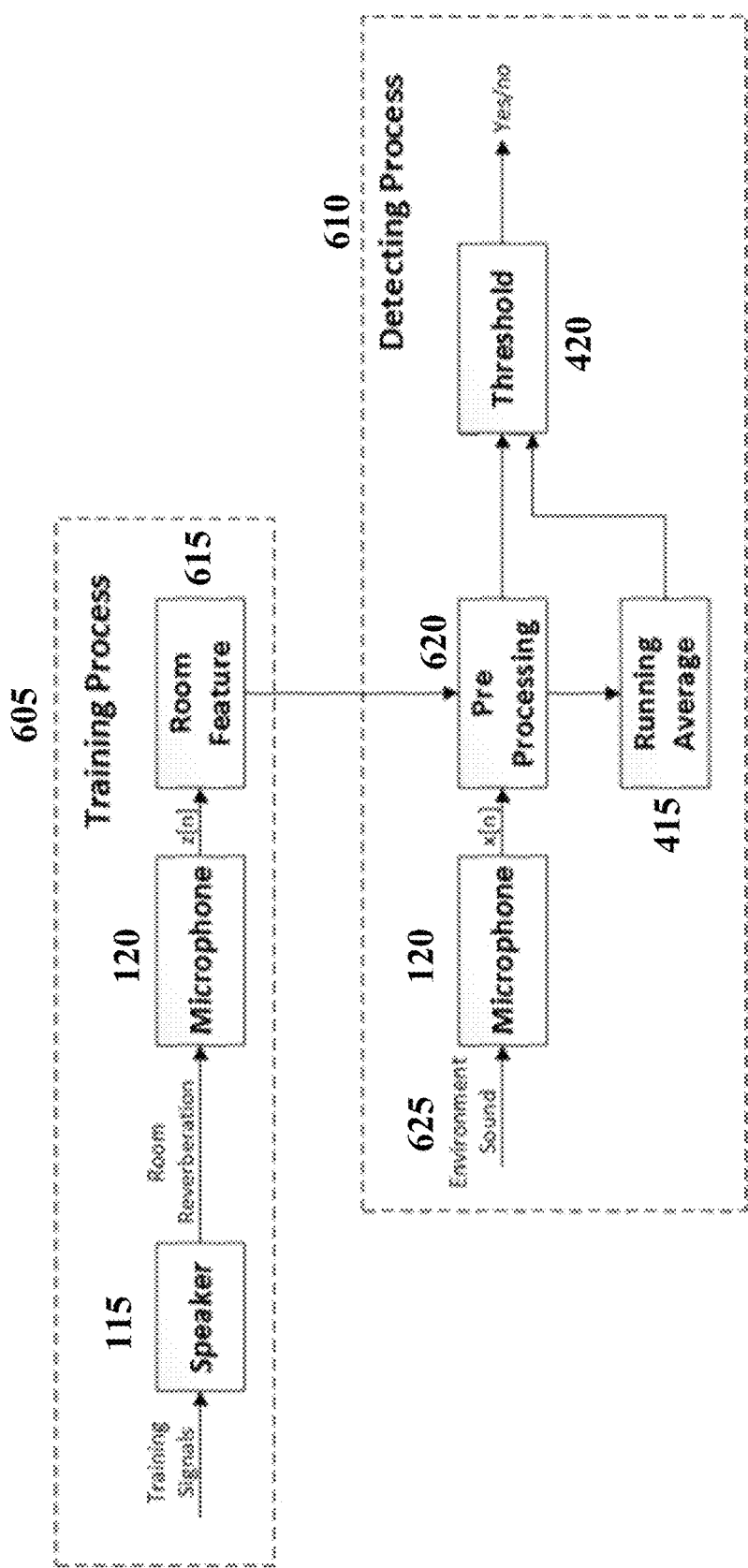
FIG. 6 displays a flow chart including a training process and a detecting process in accordance with embodiments.

FIG. 6 displays a flow chart 600 including a training process 605 and a detecting process 610 in accordance with embodiments. The training process 605 may include the speaker acoustic output 115 receiving training signals in the form of analog signals. The analog signals (as outbound acoustic signal 140) may be expelled by the speaker acoustic output 115 to its surrounding environment, wherein room reverberation may occur if the unit 100 is within a room. A microphone acoustic input 120 may receive the reverberated signals in the form of an inbound acoustic signal 135. The inbound acoustic signal 135 may then be sent to the digital computing device 105 via an analog-to-digital converter 125.

By utilizing algorithms and digital signal processing, the inbound acoustic signal 135 may be transformed into data including room features 615. The room features data 615 may be stored in the digital computing device 105 and may be utilized in a pre-processing step 620 of the detecting process 610, which may take place after the microphone acoustic output 120 receives environment sounds 625 and sends the environment sounds 625 to the digital computing device 105. The digital computing device 105 may then transform the sounds 625 using algorithms and digital signal processing. A running average 415 and a threshold 420 may then be determined from the processed sounds 625. In embodiments, processing and pre-processing may include comparing information from the training process 605 and sounds 625 from the detecting process 610.

Figure 7:
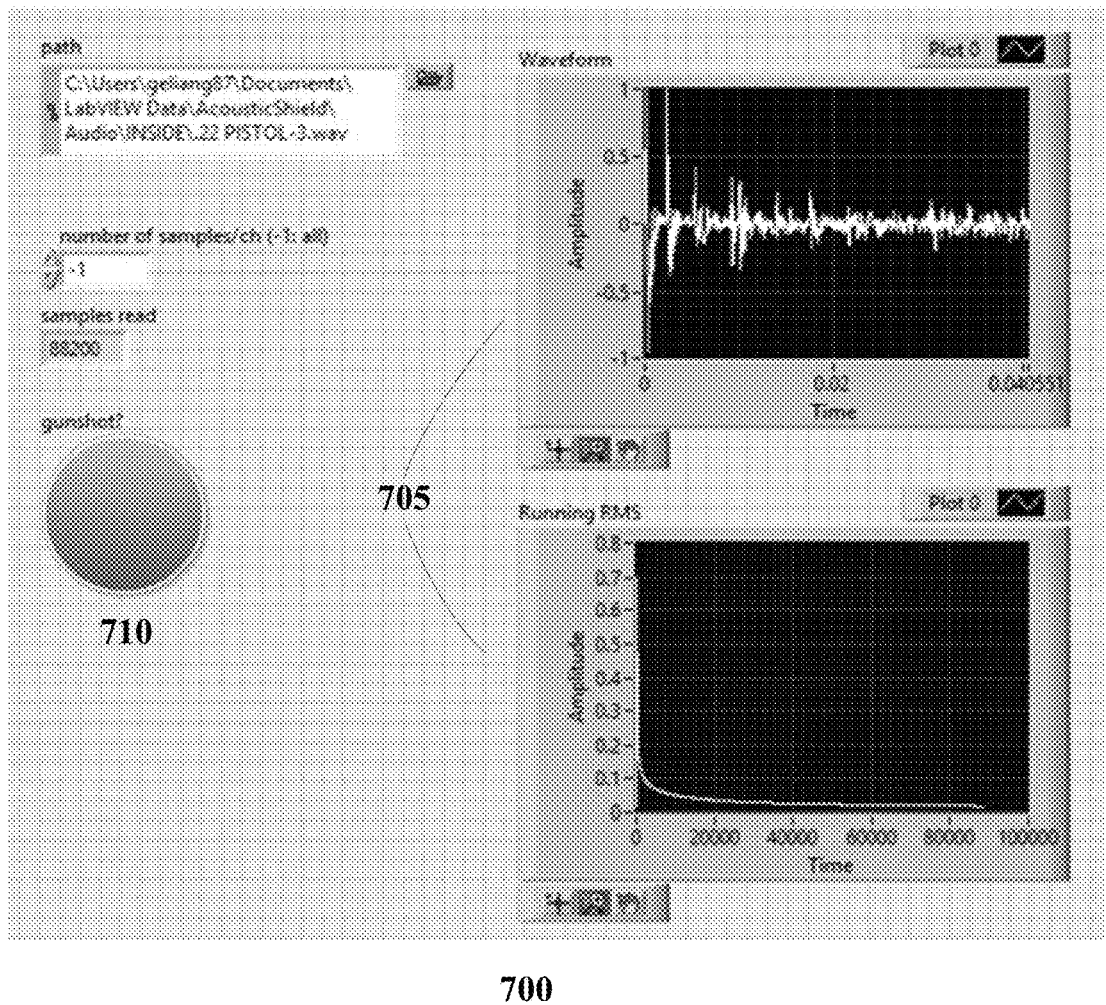
FIGS. 7 and 8 displays a first screenshot from a detection unit in accordance with embodiments.
Figure 8:
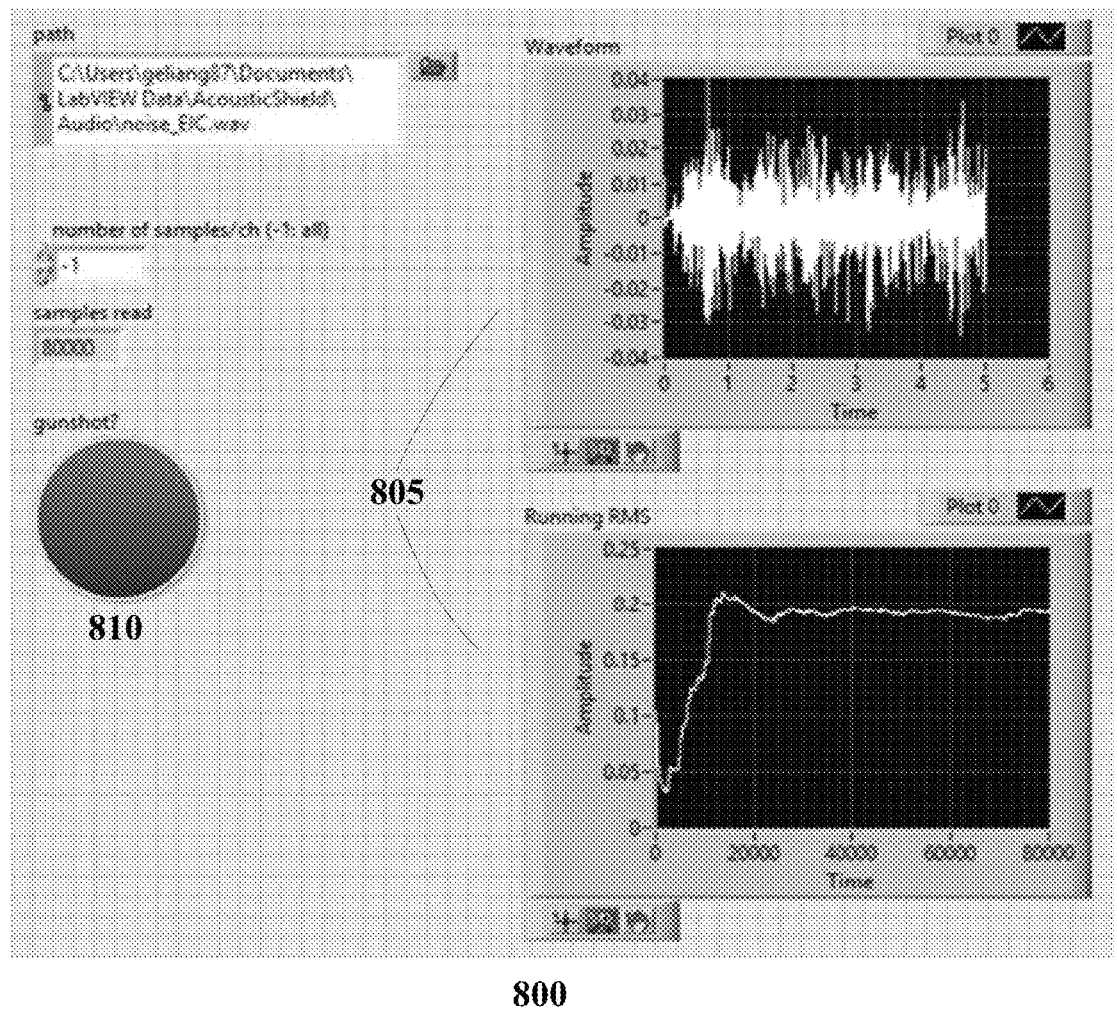

FIGS. 7 and 8 display first and second screenshots 700, 800 from a detection unit 100 in accordance with embodiments. The screenshots 700,800 may display graphs 705,805 showing comparisons of amplitude over time for waves from sounds captured by a microphone acoustic input 120 of the detection unit 100. A digital computing device 105 of the detection unit 100 may then compare the data in the graphs 705,805 with stored data gathered from training sounds. If the graphs 705,805 and the stored data are similar enough, the detection unit 100 may confirm that the waves from sounds captured by a microphone acoustic input 120 are the same sounds as the sounds of the stored data gathered from training sounds. The confirmation may be affirmed with graphics 710,810 changing a specific color.

Figure 9:
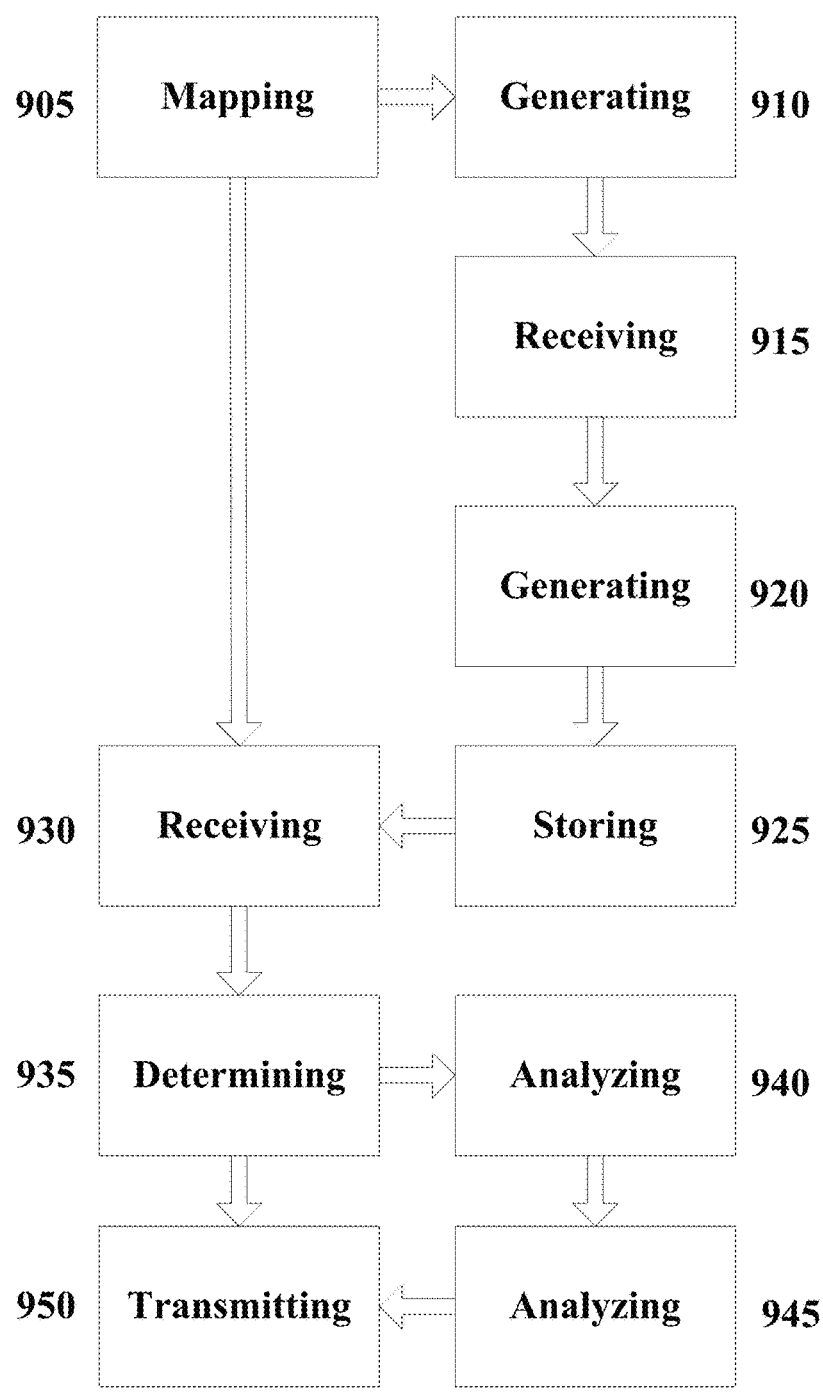
FIG. 9 displays a method for detecting and responding to noise in accordance with embodiments.

FIG. 9 displays a method 900 for detecting and responding to noise in accordance with embodiments. Method 900 may comprise mapping 905 an environment. In embodiments, the step of mapping 905 an environment may comprise generating 910 an outbound acoustic signal 140 and reflected acoustic signals. In embodiments, the reflected acoustic signals may be the reflections of the outbound acoustic signal 140 after it has reflected off of portions of the ambient environment. Once the reflected acoustic signals have been generated, the reflected acoustic signals may be received 915.

Mapping 905 may further comprise generating 920 an acoustic map of the ambient environment based on analysis of the reflected acoustic signals and storing 925 the acoustic map of the ambient environment.

The method may further comprise receiving 930 an inbound acoustic signal 135 and determining 935 if the inbound acoustic signal 135 is a gunshot. In embodiments, the determining 935 may comprise analyzing 940 the inbound acoustic signal 135 against known gunshot signals and analyzing 945 the inbound acoustic signal 135 against the acoustic map of the ambient environment.

The method may further comprise transmitting 950 a notification signal responsive to a positive determination that the inbound acoustic signal is consistent with a gunshot. In embodiments, the notification signal may be sent to a remote device 30.

In embodiments, the step of analyzing 940 the inbound acoustic signal 135 against known gunshot signals may comprise accessing a database comprising known gunshot signals and comparing the inbound acoustic signals 135 against the known gunshot signals in the database.

In embodiments, the determining 935 may further comprise iterating the mapping 905 to update the acoustic map of the ambient environment. In embodiments, the iterating may occur at a predetermined regular interval. In embodiments, the iterating may occur responsive to a user input.

In embodiments, the transmitting 950 may comprise transmitting the notification signal to a remote device 30 via a computer communication network. In embodiments, the notification signal may comprise information on an origin location of the inbound acoustic signal 135.

In embodiments, the detection unit 100 may be utilized to detect noise from a gunshot.

In embodiments, the detection unit 100 may be configured to detect noises with decibels greater than that of what a supersonic projectile may have. For instance, the detection system 100 may be able to properly detect and identify shots fired from a gun. When recording a gunshot, five distinct noises may be recorded that may include a muzzle blast, a supersonic shock wave, a mechanical action, a environmental surface vibration, and environmental noise.

In embodiments, the system may be designed to process noise from a number of differently configured outdoor or confined areas such as, but not limited to outdoor parks, amphitheaters, yards, classrooms, malls, movie theaters, churches, and banks.

For the purposes of this disclosure, the system may comprise a detection unit 100.

Figure 10:
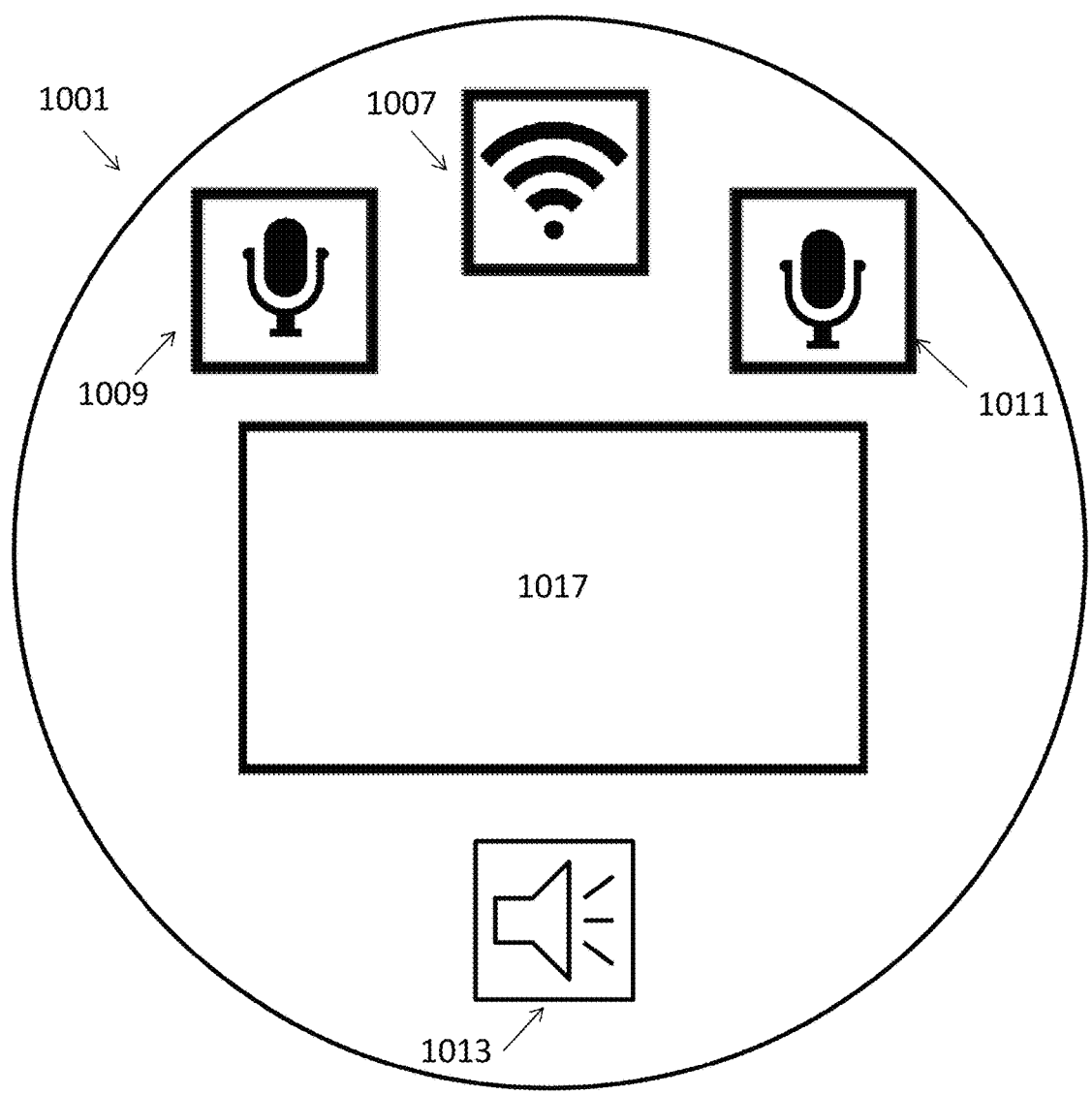
FIG. 10 displays the enclosure of a potential unit and its configuration in accordance with embodiments.

FIG. 10 shows a system 1001 for detection in an embodiment. System 1001 is substantially identical to system 101 described elsewhere in this disclosure, except as otherwise described herein or illustrated in the figures. System 1001 may include a microphone 1009, an ultrasonic microphone 1011, an ultrasonic speaker 1013, a networking interface 1007, and an electronic, LCD, touch screen display, or any modern display available 1017. This diagram shows a possible enclosure for a production unit, with the microphones receiving normal sonic and ultrasonic signals, the speaker emitting ultrasonic signals, and the display used to give various information relating to the signals.

Figure 11:
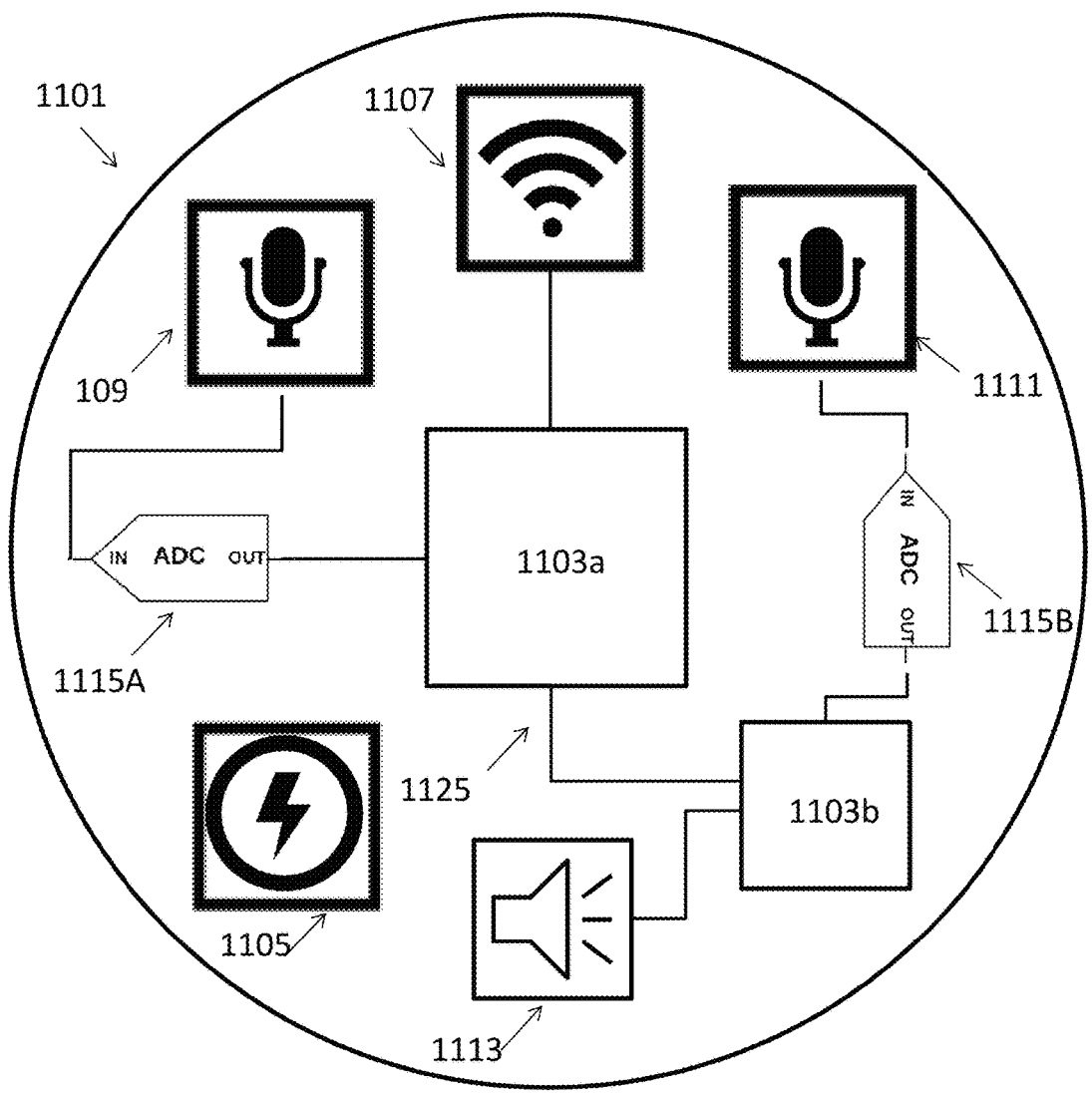
FIG. 11 displays the inside of a potential unit and its configuration in accordance with embodiments.

FIG. 11 shows a system 1101 for detection in an embodiment. System 1101 is substantially identical to system 101 described elsewhere in this disclosure, except as otherwise described herein or illustrated in the figures. System 1101 may include a microphone 1109, an ultrasonic microphone 1111, an ultrasonic speaker 1113, a networking interface 1107, a power or battery component 1105, a communication bus 1125, two analog-to-digital-converters (ADCs) 1115A and 1115B, two data processing units 1103A and 1103B. This setup may be an example of an inside view of the unit shown in FIG. 10. The system shows the microphones receiving normal sonic and ultrasonic signals, the speaker emitting ultrasonic signals, the ADCs converting the analog signals to digital ones, the power unit powering the device, data processor 1103B carrying out the environmental mapping process, and data processor 1103A processing all incoming data and using the network module 1107 to generate an alarm signal or notification.

Figure 12:
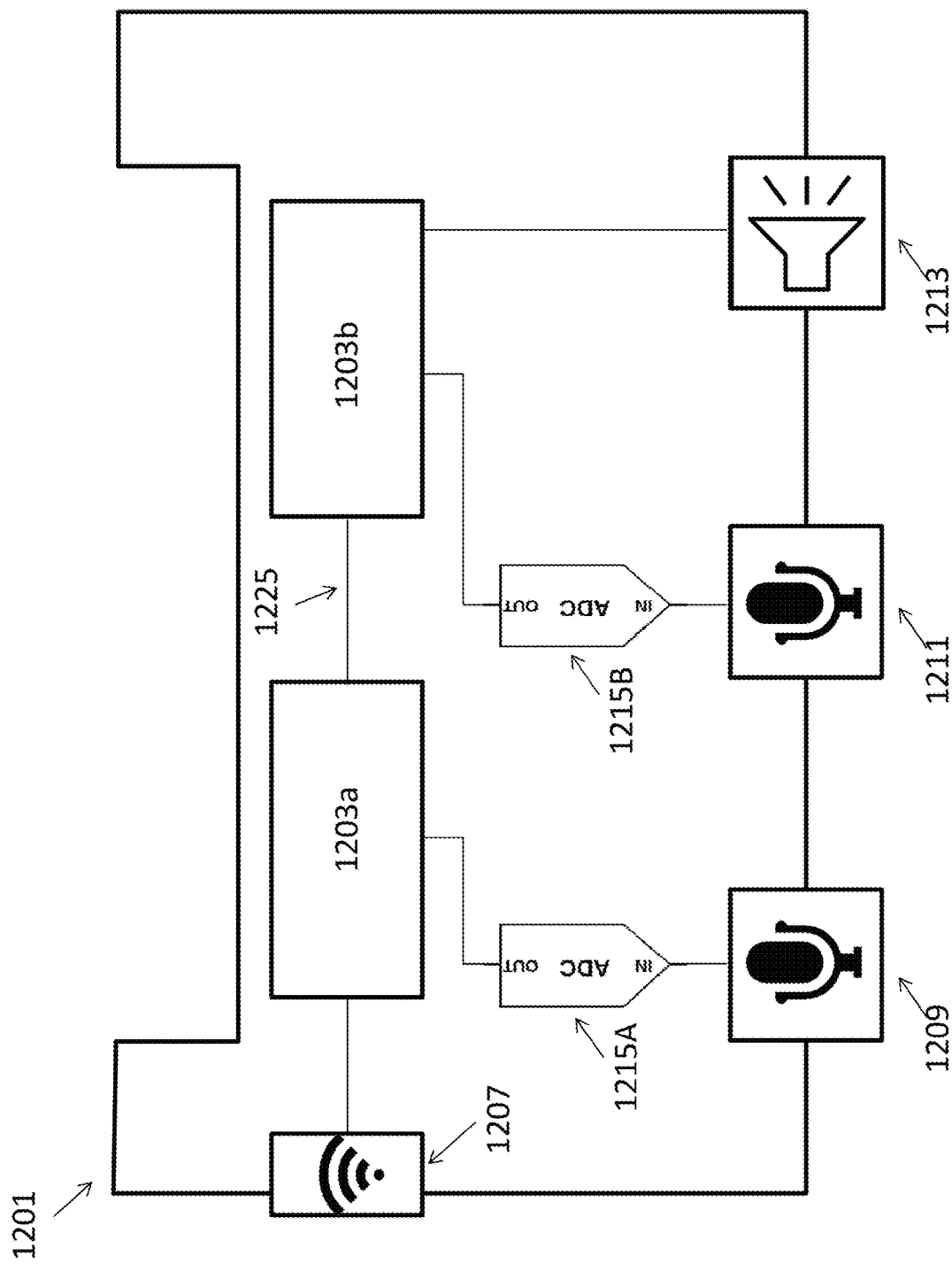
FIG. 12 displays the system level view of a potential unit and its configuration in accordance with embodiments.

FIG. 12 shows a system 1201 for detection in an embodiment. System 1201 is substantially identical to system 101 described elsewhere in this disclosure, except as otherwise described herein or illustrated in the figures. System 1201 may include a microphone 1209, an ultrasonic microphone 1211, an ultrasonic speaker 1213, a networking interface 1207, two analog-to-digital-converters (ADCs) 1215A and 1215B, two data processing units 1203A and 1203B. This diagram may be an example of an inside view of a unit. The system shows the microphones receiving normal sonic and ultrasonic signals, the speaker emitting ultrasonic signals, the ADCs converting the analog signals to digital ones, the power unit powering the device, data processor 1203B carrying out the environmental mapping process and passing the data to 1203A using communication bus 1225, and data processor 1203A processing all incoming data and using the network module 1207 to generate an alarm signal or notification.

Figure 13:
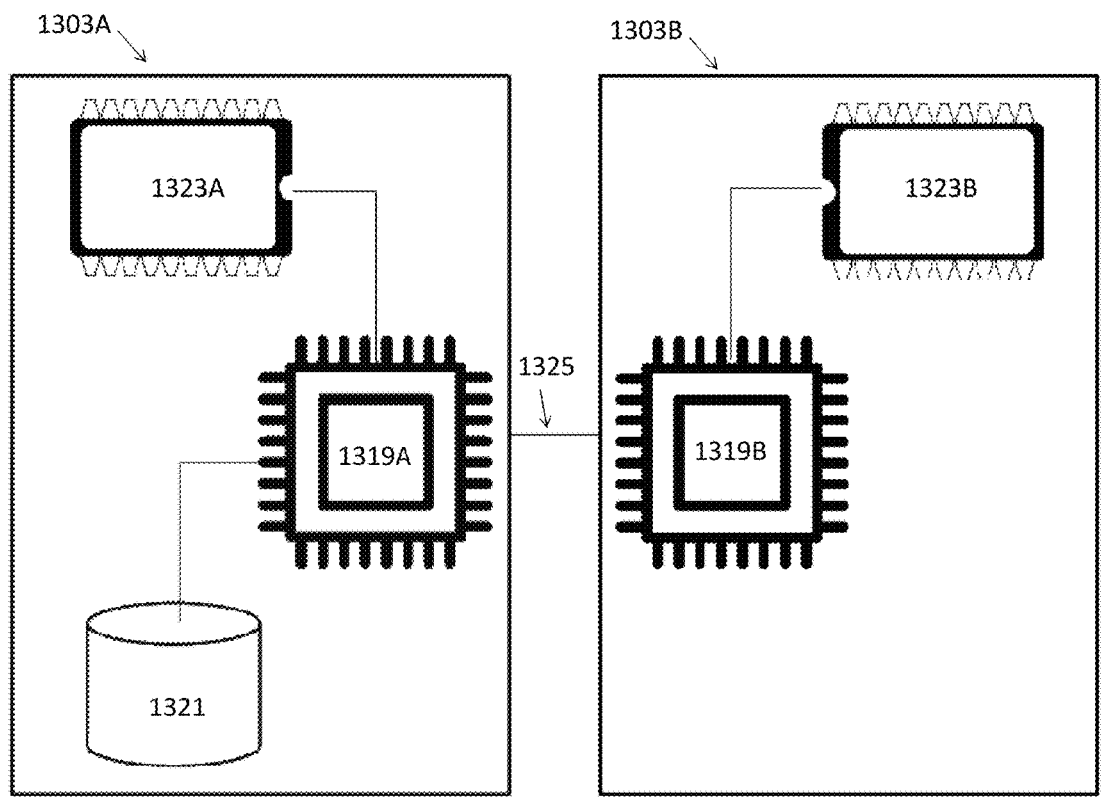
FIG. 13 displays a processing unit configuration in accordance with embodiments.

FIG. 13 shows a system 1301 for detection in an embodiment. System 1301 is substantially identical to system 101 described elsewhere in this disclosure, except as otherwise described herein or illustrated in the figures. System 1301 may include data processing modules 1303A and 1303A these modules coincide with data processing modules 1103A and 1203A, and 1103B and 1203B. This system may be comprised within the interior of at least one of those modules. 1303A may include 1319A which is a processor (CPU, GPU, DSP, FPGA, MCU etc), RAM memory 1323A, and additional memory for data 1321. 1303B may include 1319B which is a processor (CPU, GPU, DSP, FPGA, MCU etc), and RAM memory 1323B. 1303A and 1303B may be connected by a communication bus 1325. 1303B may process incoming environmental mapping data and forward it using communication bus 1325 to 1303A. 1303A may process all incoming audio data and the data coming from communication bus 1325 and may place that data into memory or transmit it to the networking interface module 1107 or 1207.

Figure 14:
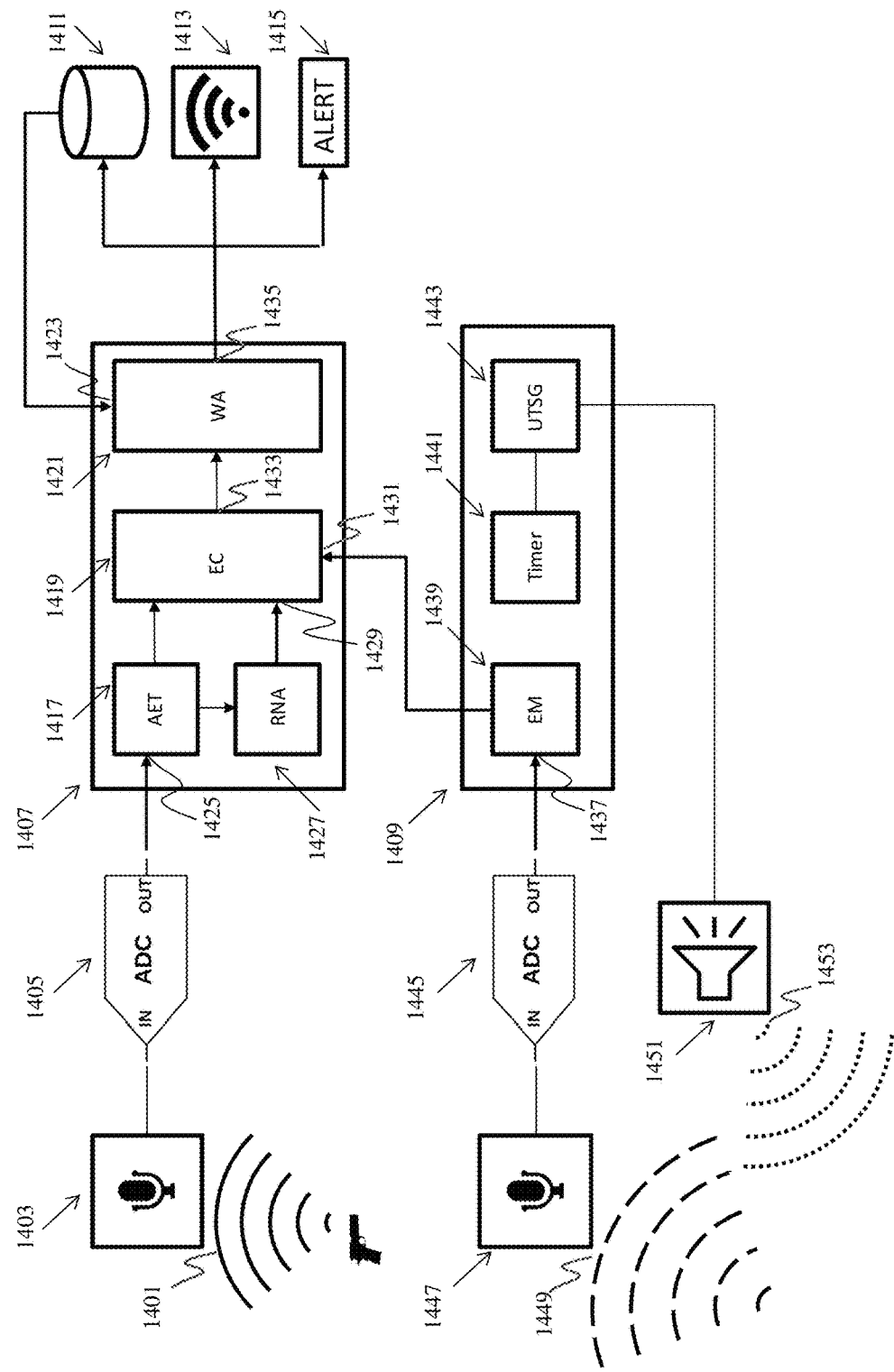
FIG. 14 displays a detailed system level design of a unit in accordance with embodiments.

FIG. 14 shows a system 1400 for detection in an embodiment. System 1401 is substantially identical to system 101 described elsewhere in this disclosure, except as otherwise described herein or illustrated in the figures. System 1400 may include a microphone 1403, an ultrasonic microphone 1447, an ultrasonic speaker 1451, a networking interface 1413, two analog-to-digital-converters (ADCs) 1405 and 1445, and two data processing units 1407 and 1409. Inside data processing unit 1407 there may be an Acoustic Energy Threshold (AET) module 1417, a Repetitive Noise Analyzer (RNA) 1427, Environmental Cancellation (EC) module 1419, and Waveform Analysis (WA) module 1421. Inside data processing unit 1409 there may exist an Environmental Mapping (EM) module 1439, a timer 1441, and an Ultrasonic Training Signal Generation (UTSG) module 1443, a memory module 1411, and an alert notification 1415. This system may represent a detailed inside view of a detection unit 100. The microphones may receive normal sonic 1401 and ultrasonic signals 1449, while the speaker may emit ultrasonic signals 1453. The ultrasonic emitter 1451 may emit an ultrasonic signal 1453 at a set interval using the Timer 1441, which may bounce around the environment and return the ultrasonic signal 1449 to the ultrasonic microphone 1447. This signal may be processed by an ADC 1445 into a digital signal and may enter module 1409. Inside the EM module 1439 controls the timer 1441, and the UTSG and the EM module may use the data collected to produce an acoustic environmental map. This data may be sent through 1431 communication bus to the EC module 1419. In the event of predetermined noise 1401, such as a gunshot, the predetermined noise 1401 may be picked up by the microphone 1403, sent through the ADC 1405, and converted into a digital signal. This signal may be measured against the AET 1417 and the RNA 1427, which may monitor repetitive noises. This information may then be passed to the EC 1419 and compared to the data received via module 1409. It may then be sent to the WA 1421 via communication bus 1433. The signal may then be compared using waveform analysis and may be determined to be either the predetermined noise desired (in this case a gunshot) or not. The memory unit 1411 may receive short recordings (approx. 10 ms) used for forensics or future analysis and algorithm improvement. If the sound is determined to be the noise that is being searched for, (in this case a gunshot), an alert 1415 may be generated and the networking interface 1413 may be used to send the alert, connect to an existing network, or connect multiple units.

Figure 15:
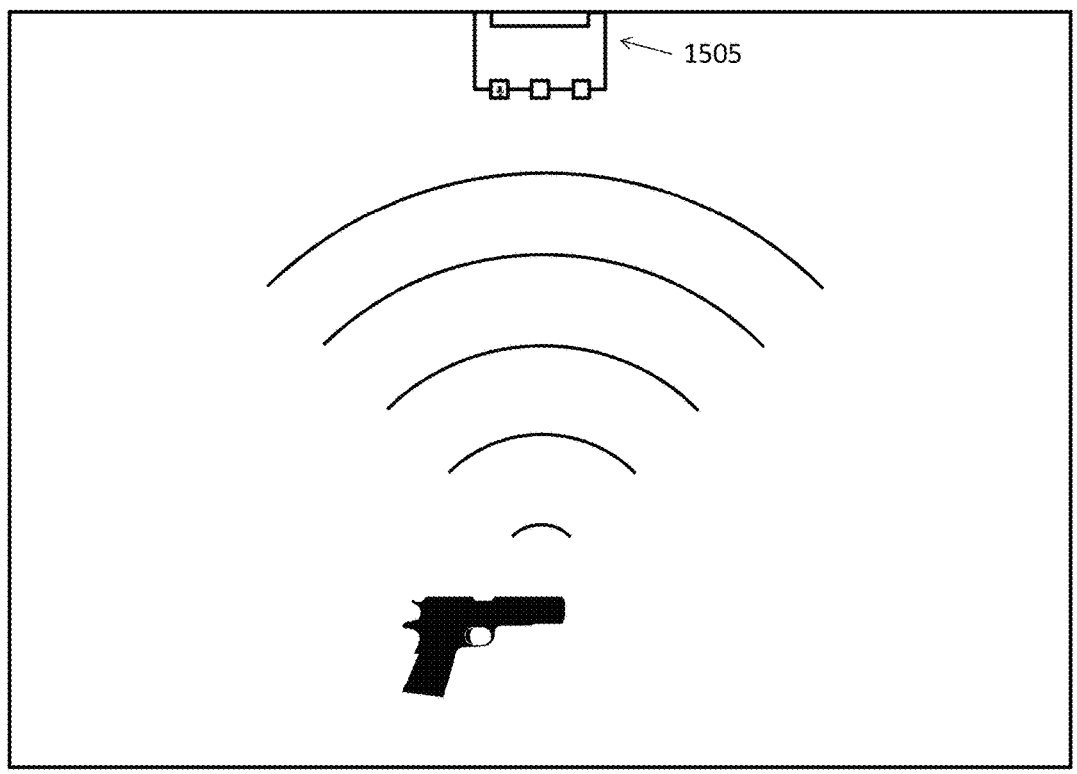
FIG. 15 displays a unit detecting an acoustic anomaly or noise in accordance with embodiments.

FIG. 15 shows a system 1505 for detection in an embodiment. System 1505 is substantially identical to system 101 described elsewhere in this disclosure, except as otherwise described herein or illustrated in the figures. System 1505 may include sensor 1505 as described in FIG. 14. An acoustic event is shown in FIG. 15 (in this case a gunshot) being detected by sensor 1505.

Figure 16:
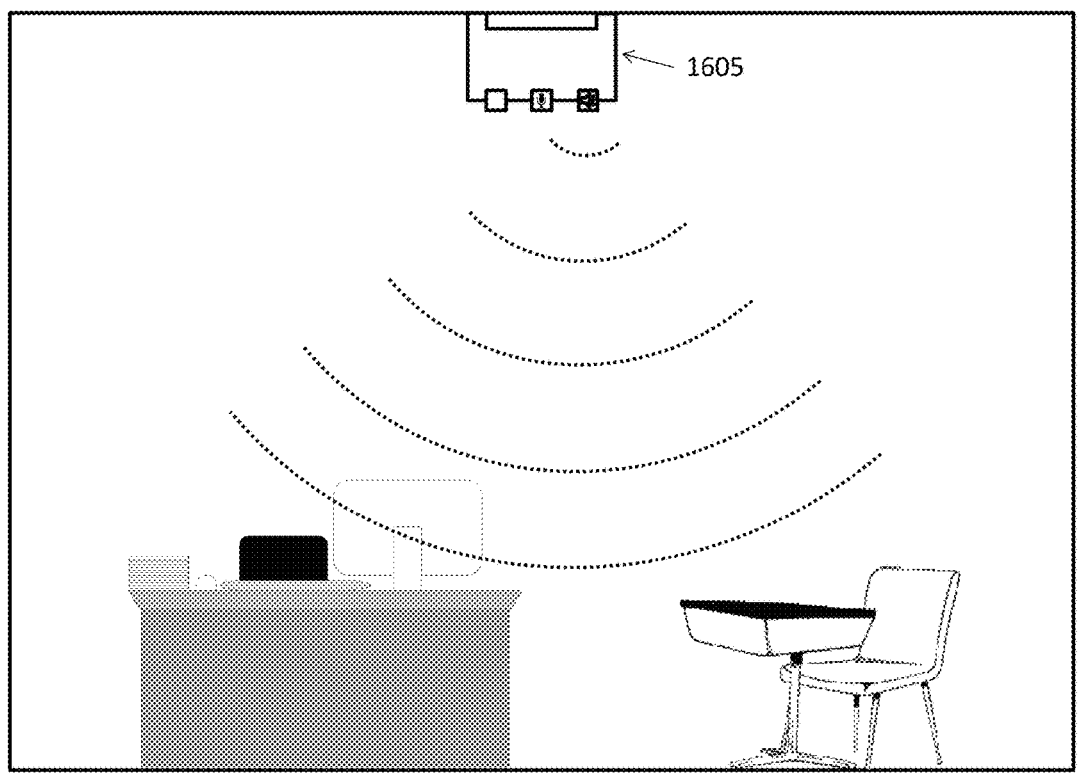
FIG. 16 displays a unit generating an ultrasonic training signal in accordance with embodiments.

FIG. 16 shows a system 1605 for detection in an embodiment. System 1605 is substantially identical to system 101 described elsewhere in this disclosure, except as otherwise described herein or illustrated in the figures. System 1605 may include a sensor 1605 as described in FIG. 14. An ultrasonic emission is shown being generated to create an environmental acoustic map of items found in a classroom.

Figure 17:
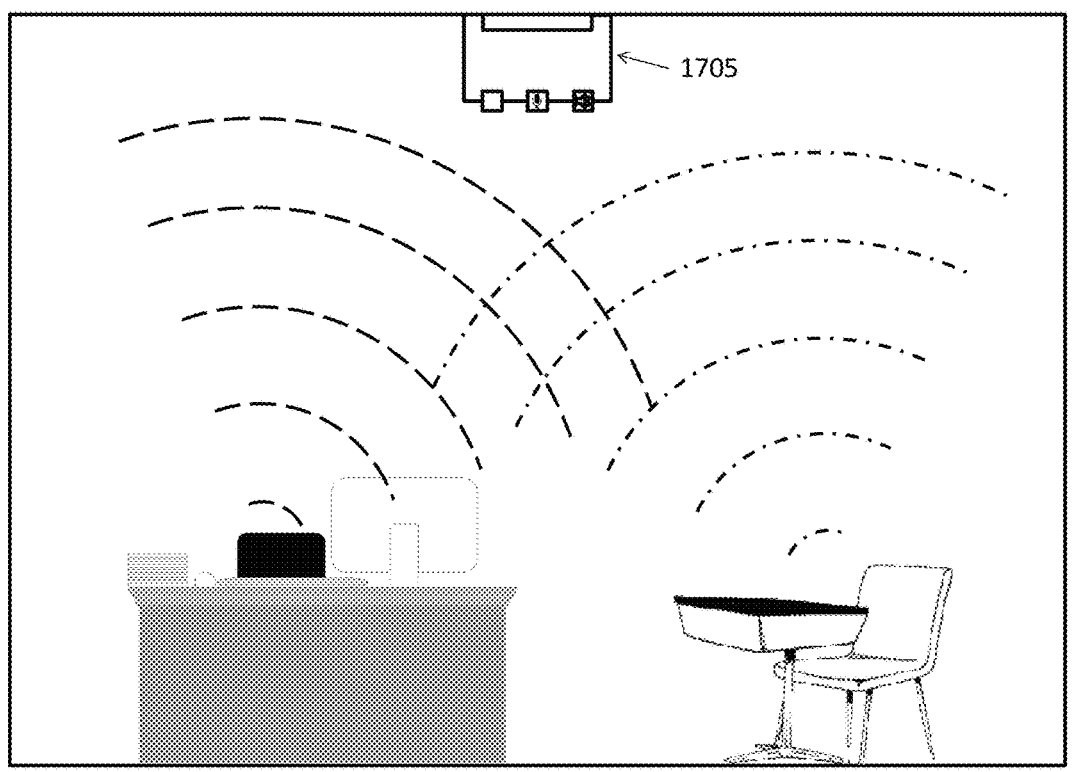
FIG. 17 displays a unit receiving an ultrasonic training signal after reflecting on an environment in accordance with embodiments.

FIG. 17 shows a system 1705 for detection in an embodiment. System 1705 is substantially identical to system 101 described elsewhere in this disclosure, except as otherwise described herein or illustrated in the figures. System 1705 may include a sensor 1705 as described in FIG. 14. An ultrasonic emission is shown being received after bouncing against nearby objects to create an environmental acoustic map (items found in a classroom).

Figure 18A:
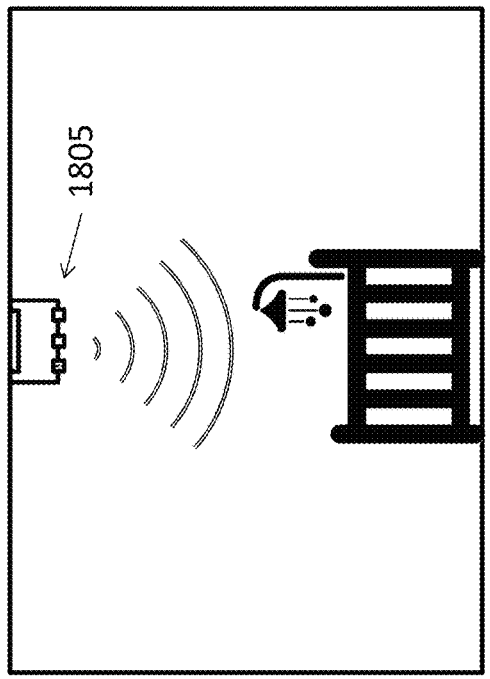
FIGS. 18A-18D display a unit generating a training signal and detecting an acoustic anomaly or noise in accordance with embodiments.
Figure 18B:
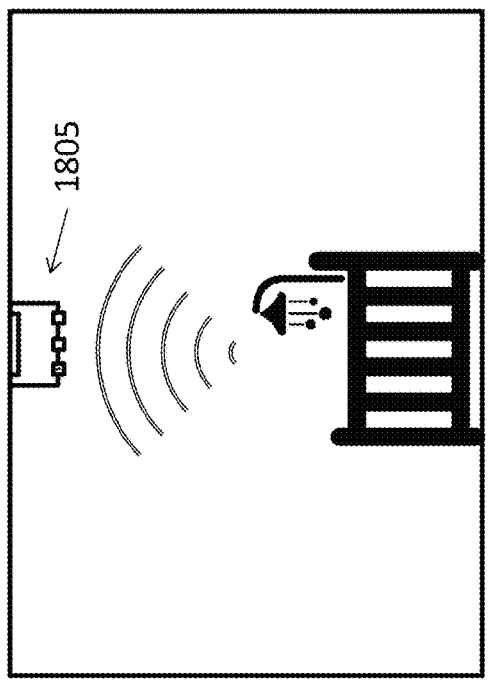
Figure 18C:
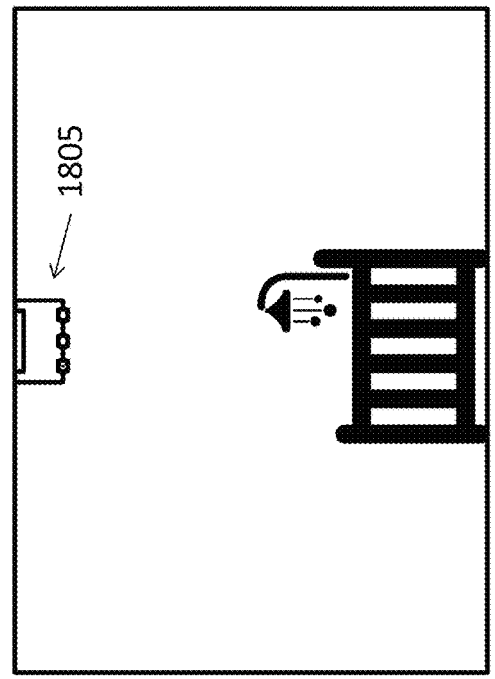
Figure 18D:
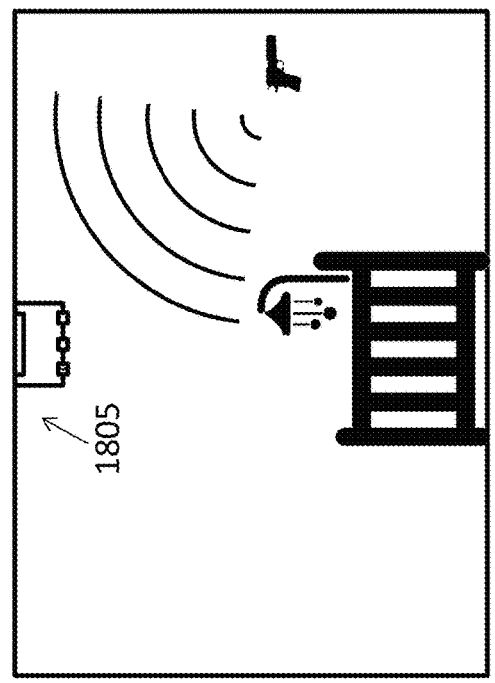

FIGS. 18A, 18B, 18C and 18D each show a system 1805 for detection in an embodiment. System 1805 is substantially identical to system 101 described elsewhere in this disclosure, except as otherwise described herein or illustrated in the figures. System 1805 may include a sensor 1805 as described in FIG. 14. Displayed in FIG. 18A is an ultrasonic emission being generated to create an environmental acoustic map. Displayed in FIG. 18B is an ultrasonic emission being received after bouncing against nearby objects to create an environmental acoustic map. Displayed in FIG. 18C is device 1805 in standby and listening. Displayed in FIG. 18D is a gunshot, the waves of which may be received by sensor 1805. Once received by sensor 1805, the waves may be processed as shown and described in FIG. 14 and its correlating description.

Figure 19:
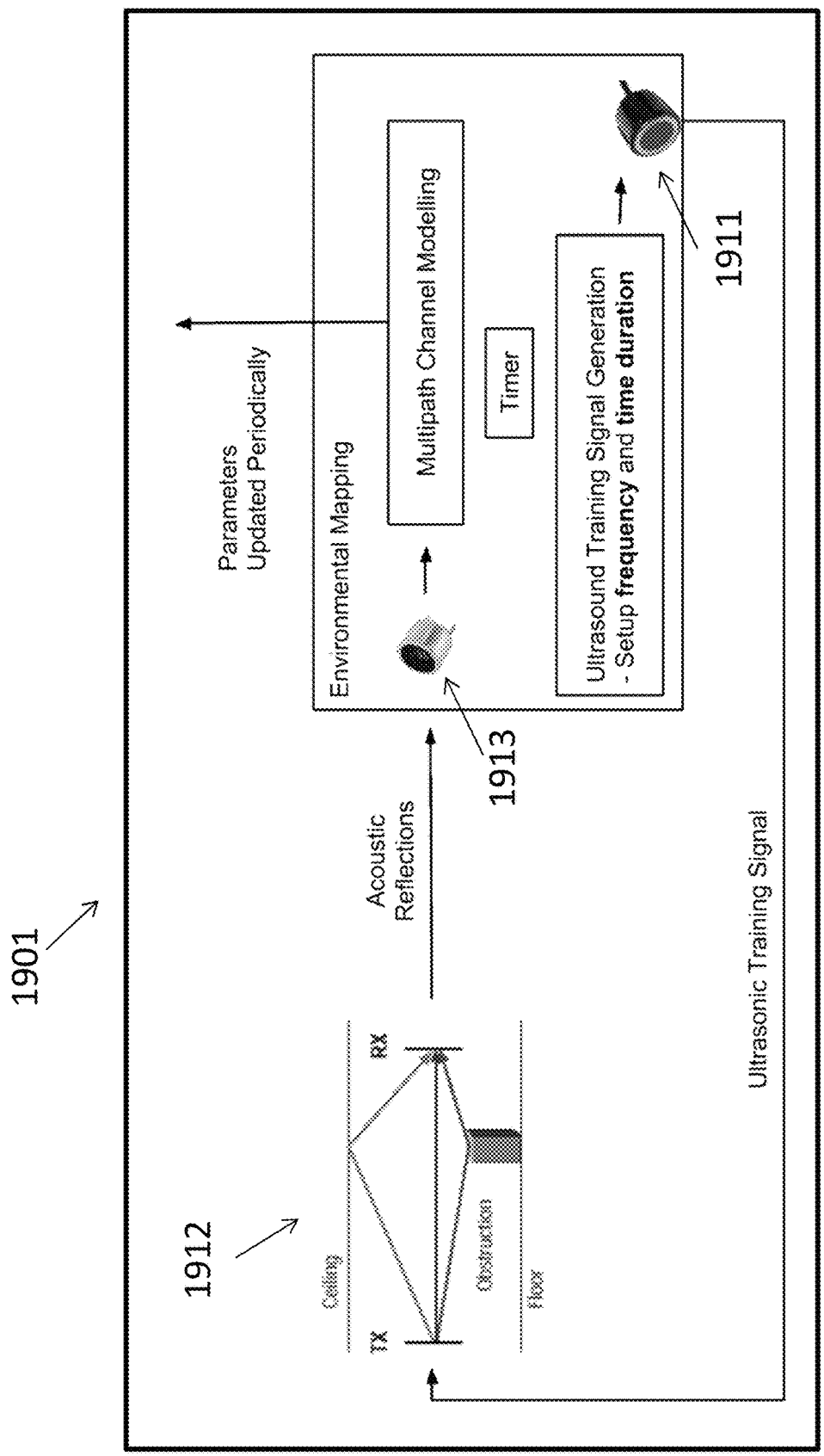
FIG. 19 displays an Ultrasonic Training Signal Generation (UTSG) module for detection in accordance with embodiments.

FIG. 19 shows Ultrasonic Training Signal Generation (UTSG) module 1901 for detection in accordance with embodiments. Ultrasonic Training Signal Generation (UTSG) module 1901 is substantially identical to system 101 described elsewhere in this disclosure, except as otherwise described herein or illustrated in the figures. Ultrasonic Training Signal Generation (UTSG) module 1901 may function similarly to module 1409 displayed in FIG. 14. A signal may be emitted by ultrasonic speaker 1911, may bounce around the room or environment 1912, and may return as an acoustic reflection to the ultrasonic microphone 1913. The UTSG 1901 may process the signal and may pass it to another module, the process of which may be found in FIG. 14.

Figure 20:
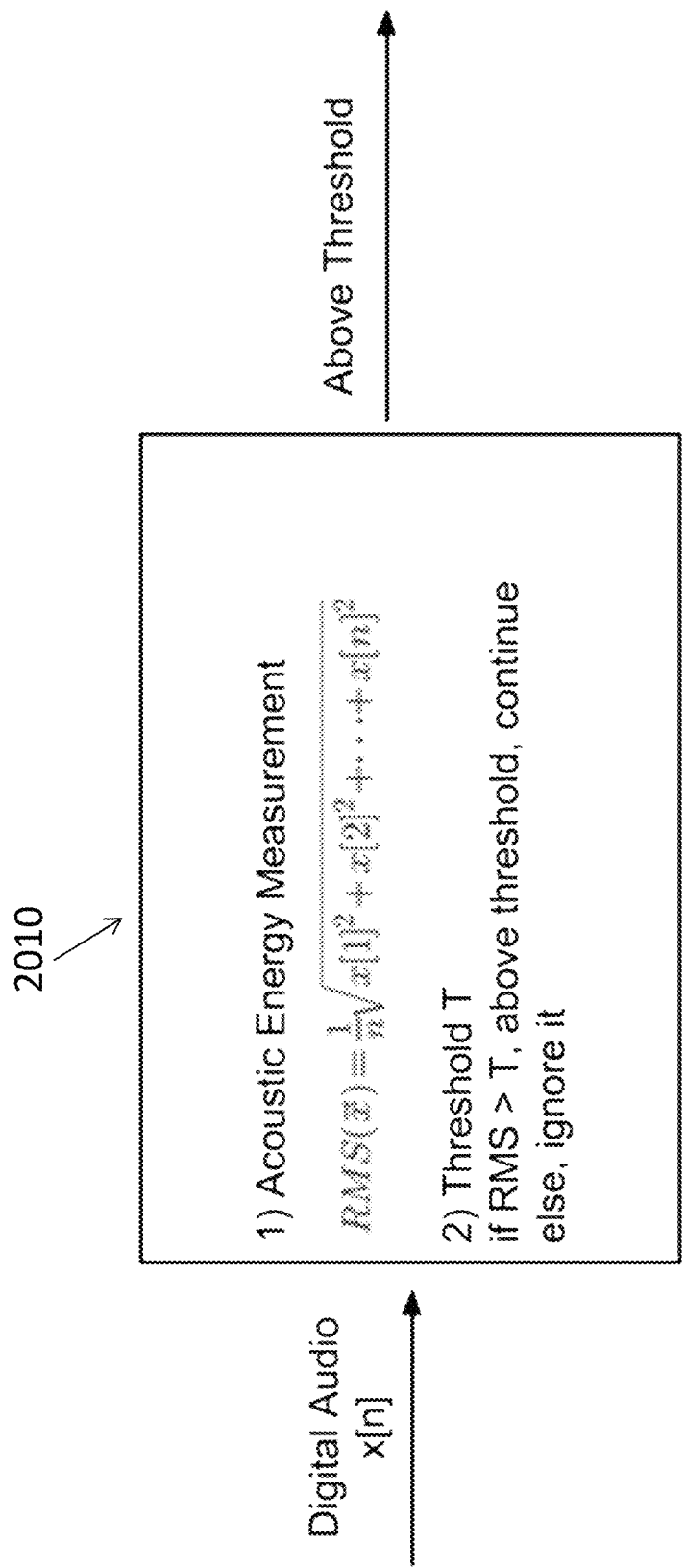
FIG. 20 displays an acoustic energy threshold module and potential functions in accordance with embodiments.

FIG. 20 displays an acoustic energy threshold module and potential functions in accordance with embodiments. The Acoustic Energy Threshold (AET) module 2010 may filter out irrelevant acoustic signals. Digital audio signal may be stored in a buffer of size N. N may be programmed to be close to a time length of an anomaly. Acoustic energy may be calculated by root mean square operations over the buffer of size N, shown in FIG. 20. Threshold T may be determined using a pre-implementation analysis of the anomaly in a particular environment.

Figure 21:
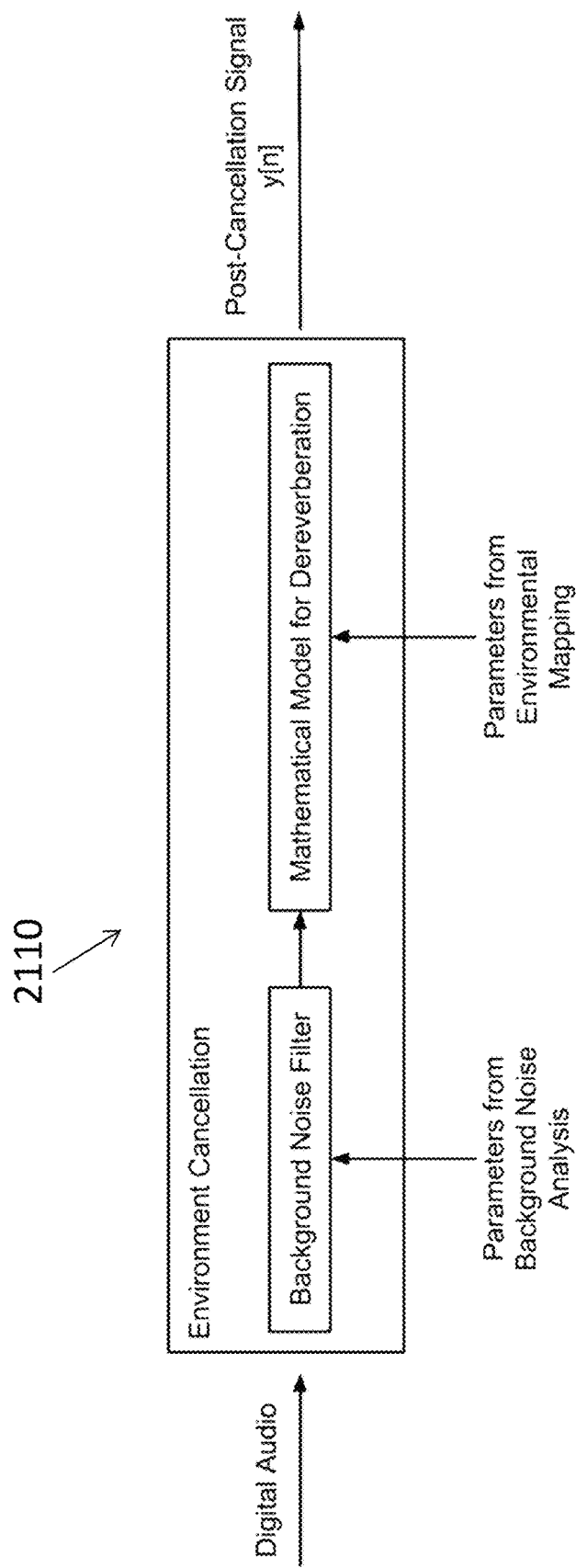
FIG. 21 displays the environmental cancellation module and potential functions in accordance with embodiments.

FIG. 21 shows an Environmental Cancellation (EC) module for detection in an embodiment. Environmental Cancellation (EC) module 2110 is substantially identical to system 101 described elsewhere in this disclosure, except as otherwise described herein or illustrated in the figures. The Environmental Cancellation (EC) module may provide a cleaner copy of acoustic events for further waveform analysis. If the Boolean signal indicates that an acoustic signal is below the energy threshold, no operation will be conducted. If not, digital audio signal may go through two filters. The first filter may remove background noise that occurs in a particular environment constantly. The second filter may provide the function of acoustic de-reverberation, which means removing reflected signals scattered in the environment. Both filters have mathematical models implemented as cores. Other modules with proper data communication interfaces may feed the parameters for the mathematical models.

Figure 22:
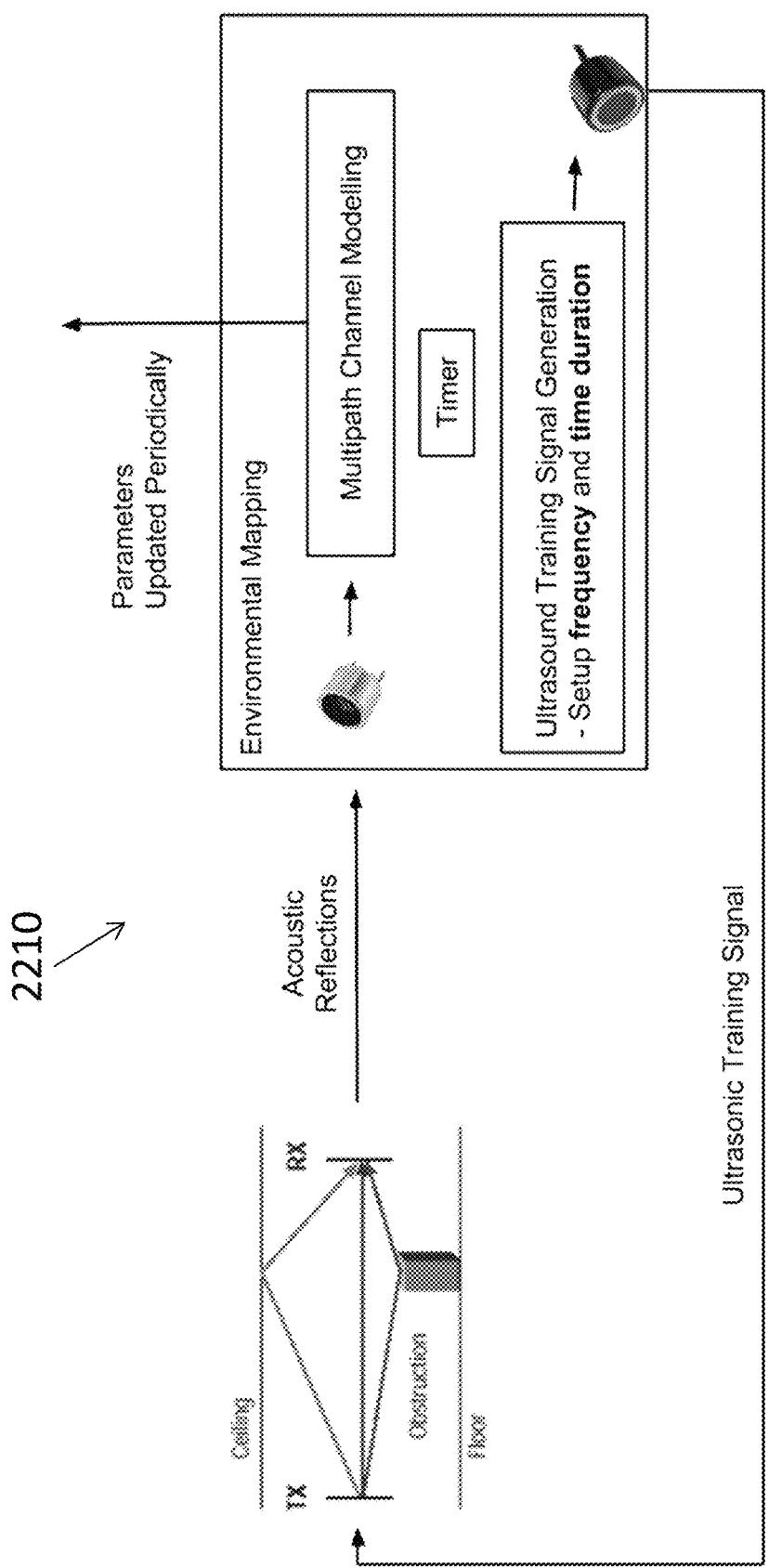
FIG. 22 displays Environmental Mapping (EM) module for detection in accordance with embodiments.

FIG. 22 shows Environmental Mapping (EM) module 2210 for detection in accordance with embodiments. Environmental Mapping (EM) module 2210 may be shown in FIG. 22. The Environmental Mapping (EM) module 2210 may be set to operate periodically. The purpose may be to attain parameters for mathematical models representing acoustic reverberations. The ultrasonic training signal may be created with a proper frequency greater than 20 KHz and a relative smaller time length compared to the first reverberation time. After acoustic reverberations, this module 2210 may receive a multipath signal (denoting the training signal as TX and the received signal as RX). The correlation of TX and RX may yield the correct value for time delays and signal attenuations.

Figure 23:
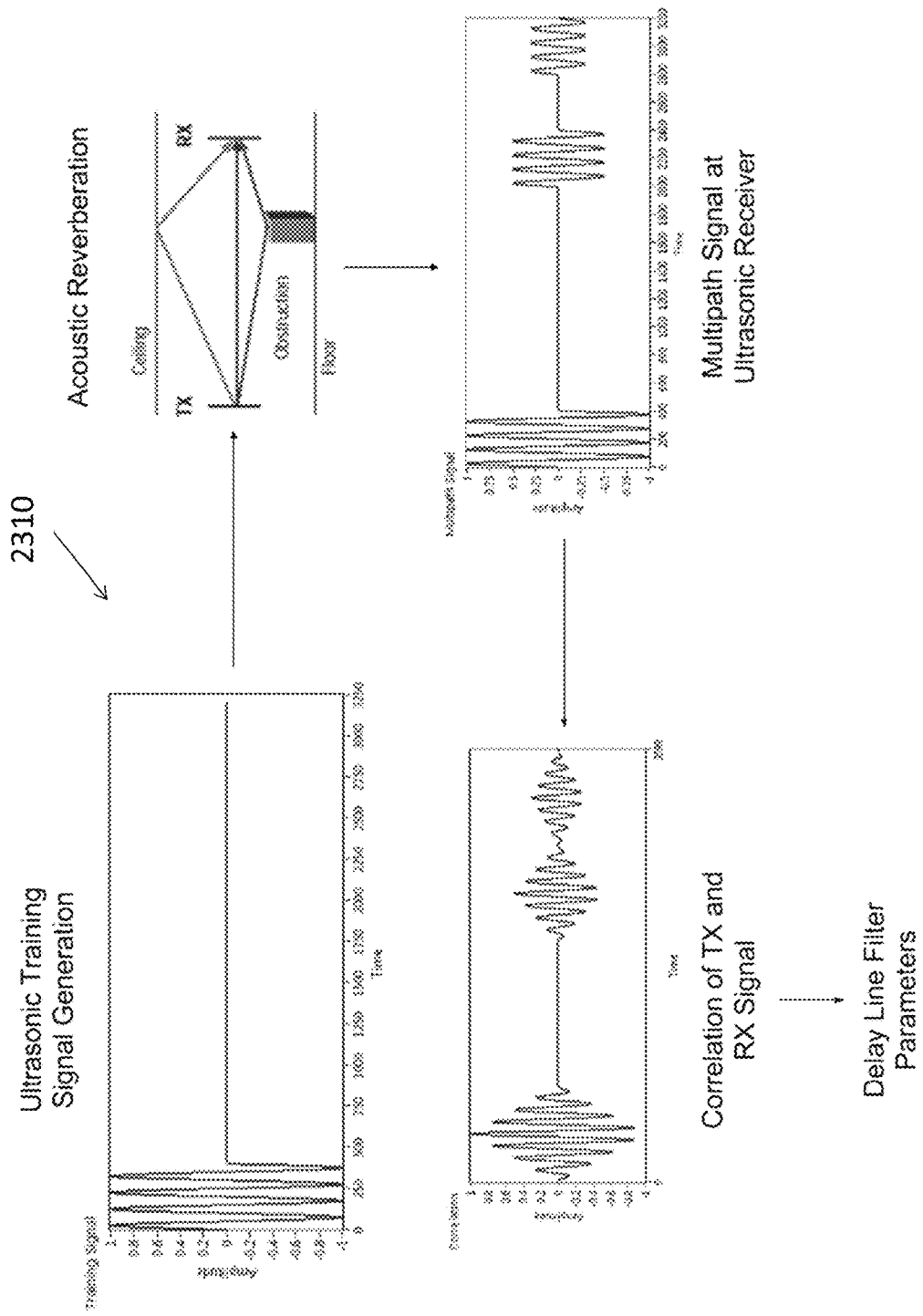
FIG. 23 displays at least a portion of a detection method 2310 in accordance with embodiments.

FIG. 23 shows at least a portion of a detection method in accordance with embodiments. FIG. 23 may further show how the Environmental Mapping (EM) module 2210 may be set to operate periodically. The purpose may be to attain parameters for mathematical models representing acoustic reverberations. The ultrasonic training signal may be created with a proper frequency greater than 20 KHz and a relative smaller time length compared to the first reverberation time. After acoustic reverberations, the module 2210 may receive a multipath signal (denoting the training signal as TX and the received signal as RX). The correlation of TX and RX may yield the correct value for time delays and signal attenuations.

Figure 24:
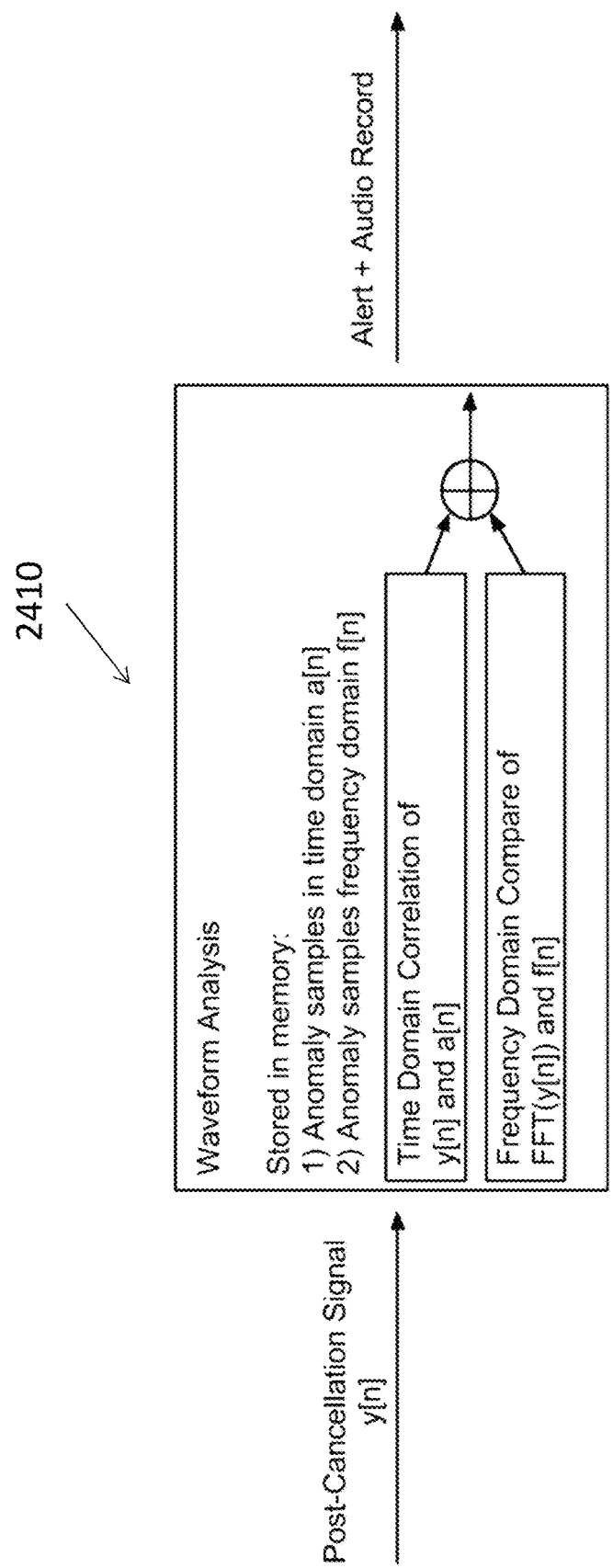
FIG. 24 displays an acoustic waveform analysis module and its function in accordance with embodiments.

FIG. 24 displays an acoustic waveform analysis module and its function in accordance with embodiments. Waveform Analysis (WA) module 2410 is substantially identical to system 101 described elsewhere in this disclosure, except as otherwise described herein or illustrated in the figures. The Waveform Analysis (WA) module 2410 may compare the audio signal with a pre-processed acoustic data segment with multiple signal processing techniques. The module may further indicate whether or not the data segment correlates with a monitored anomaly. The pre-processed data segment may be stored in a memory. The memory may be implemented separately or within other functional chips. The segment may contain time domain and frequency domain information from pre-recording or other validated source. To analyze time domain signal, a correlation based algorithm may be implemented. To analyze frequency domain signal, a FFT may be implemented at the first place to yield a vector space signal in frequency domain. Some vector-space distance function may be implemented according the nature and size of the space. Comparison result of time and frequency domain may be comprehensively considered by a metric function, which may indicate whether it is an anomaly. After an anomaly has been detected, a short audio file may be generated for further offline analysis. The indication and audio file data may be transmitted through a networking interface to a monitoring center.

Figure 25:
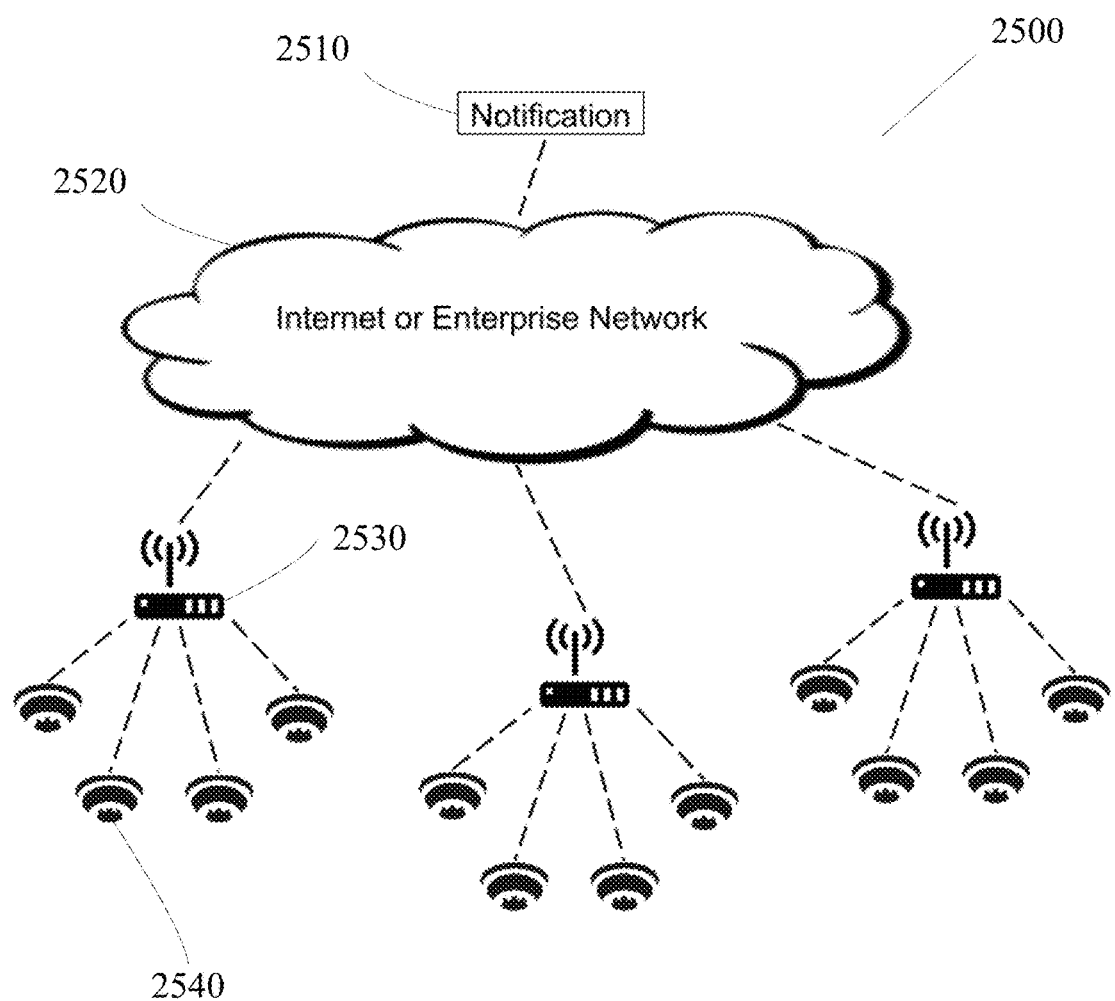
FIG. 25 displays a notification system in accordance with embodiments.

FIG. 25 displays a notification system 2500 in accordance with embodiments. A plurality of sensors 2540 may comprise characteristics similar to previously disclosed sensors unless otherwise described. Sensors 2540 may be connected to a plurality of routers 2530 that may forward information pertaining to data collected by the sensors 2540 to the internet or enterprise network 2520. Via the internet or enterprise network 2520, a notification 2510 may be sent to first responders and emergency services assuming that the information collected by the sensors 2540 correlated with a situation where individuals are in a harmful situation. Enterprise network 2520 may include cloud based computing or monitoring for additional forensic data or may include after the incident data analysis for algorithm improvement and research.

For the purposes of this disclosure, the terms "microphone acoustic input" and "input" may be synonymous.

For the purposes of this disclosure, the terms "speaker acoustic output" and "speaker" may be synonymous.

The invention claimed is:

1. A system for detecting and responding to at least one noise, the system comprising:
   a detection unit comprising:
   a digital computing device, a mapping signal emitter and a mapping signal receiver, means to acquire an analog sound signal and an analog-to-digital converter;
   the mapping signal emitter configured to transmit an outbound analog signal into the environment in which the detection unit is located to produce a reflection of the outbound signal from the environment;
   the mapping signal receiver configured to receive an inbound analog signal which is the outbound signal from mapping emitter and its reflections from the environment;
   the means to acquire an analog sound signal configured to receive an inbound acoustic signal which includes ambient sound, specific noises and their reflection from the environment;
   the means to acquire an analog sound signal configured to receive an inbound acoustic signal and to provide an inbound analog signal, the inbound acoustic signal including the reflection of the outbound acoustic signal;
   the analog-to-digital converter coupled between the means to acquire an analog sound signal and the digital computing device;
   the analog-to-digital converter configured to receive an inbound analog signal from the means to acquire an analog sound signal, convert the inbound analog signal to an inbound digital signal, and transmit the inbound digital signal to the digital computing device responsive thereto;
   the inbound acoustic signal comprising at least one of a reflection of the outbound acoustic signal and a predetermined specific noise;
   the digital computing device configured to perform an analysis on the inbound digital signal, the analysis to determine at least one of: if the inbound digital signal is consistent with the inbound acoustic signal being the specific noise, and an acoustic mapping of the environment in which the system detection unit is located, the digital computing device additionally configured to generate a first signal if the analysis determines that the inbound digital signal is consistent with the inbound acoustic signal being the specific noise, and to record the acoustic mapping of the environment in which the system is located.

2. The system of claim 1, the specific noise being a preprogrammed noise, such as a gunshot.

3. The system of claim 1, the detection unit further comprising a power supply for providing electricity to components of the detection unit.

4. The system of claim 1, the system comprising a plurality of the detection units, the plurality of the detection units being networked.

5. The system of claim 1, the system being incorporated into a fire/smoke detector.

6. The system of claim 1, the outbound acoustic signal comprising an ultrasonic frequency for acoustically mapping the environment in which the system is located.

7. The system of claim 1 comprising a transmitter, the transmitter configured to transmit a second signal via a computer communications network to a host computer system responsive to receiving the first signal from the digital computing device.

8. The system of claim 1 comprising a digital-to-analog converter, the digital-to-analog converter configured to receive an outbound digital signal from the digital computing device, convert the outbound digital signal to an outbound analog signal, and transmit an outbound analog signal to the mapping signal emitter.

9. The system of claim 1 wherein the and mapping signal receiver is a transmitter(s) and receiver(s) pair capable of emitting and receiving ultrasound, microwave or laser signals.

10. A method for detecting and responding to at least one noise, the method comprising the steps of:
    mapping an environment, the step of mapping the environment comprising: generating an outbound acoustic signal,
    generating reflected acoustic signals, the reflected acoustic signals being the reflections of the outbound acoustic signal after it has reflected off of portions of the ambient environment;
    receiving the reflected acoustic signals;
    generating an acoustic map of the ambient environment based on analysis of the reflected acoustic signals; and
    storing the acoustic map of the ambient environment,
    receiving an inbound acoustic signal, the inbound acoustic signal including the
    reflected acoustic signals;
    determining if the inbound acoustic signal is a specific noise, the determining comprising: analyzing the inbound acoustic signal against known specific noise signals; and analyzing the inbound acoustic signal against the acoustic map of the ambient environment, and
    generating a signal responsive to a positive determination that the inbound acoustic signal consistent with the specific noise.

11. The method of claim 10, further comprising the step of analyzing the inbound acoustic signal against a specific algorithm generated using recorded noise signals.

12. The method of claim 10, the determining further comprising iterating the mapping step to update the acoustic map of the ambient environment.

13. The method of claim 12, the iterating occurring at a predetermined regular interval.

14. The method of claim 12, the iterating occurring responsive to a user input.

15. The method of claim 10, the transmitting step comprising transmitting the notification signal to a remote device via a computer communication network.

16. The method of claim 10, the notification signal comprising information on an origin location of the inbound acoustic signal.

17. The method of claim 10 comprising automatically generating reflected acoustic signals, receiving the reflected acoustic signals and generating an acoustic map of the ambient environment based on analysis of the reflected acoustic signals at predetermined times periods.

18. The method of claim 10 wherein the generation of reflected acoustic signals, receiving the reflected acoustic signals and generating an acoustic map of the ambient environment based on analysis of the reflected acoustic signals is accomplished either before of following receipt of an inbound acoustic signal.

19. The method of claim 10 comprising transmitting a notification signal responsive to a positive determination that the inbound acoustic signal is consistent with the specific noise.

20. The method of claim 10 wherein the acoustic map of the ambient environment is stored on computer readable media.

* * * * *